(12) United States Patent
Parhi et al.

(10) Patent No.: US 11,374,774 B2
(45) Date of Patent: Jun. 28, 2022

(54) FEED-FORWARD XOR PHYSICAL UNCLONABLE FUNCTIONS

(71) Applicant: Regents of the University of Minnesota, Minneapolis, MN (US)

(72) Inventors: Keshab K. Parhi, Minneapolis, MN (US); S. V. Sandeep Avvaru, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/860,612

(22) Filed: Apr. 28, 2020

(65) Prior Publication Data
US 2021/0336804 A1    Oct. 28, 2021

(51) Int. Cl.
*G06F 11/30*     (2006.01)
*H04L 9/32*      (2006.01)

(52) U.S. Cl.
CPC ................................. *H04L 9/3278* (2013.01)

(58) Field of Classification Search
CPC .................................................... H04L 9/3278
See application file for complete search history.

(56) References Cited

U.S. PATENT DOCUMENTS

| | | | | |
|---|---|---|---|---|
| 7,898,283 B1* | 3/2011 | Koushanfar | .......... | H04L 9/3278 326/8 |
| 8,274,306 B1* | 9/2012 | Garcia | ............. | H03K 19/17768 326/8 |
| 2011/0055649 A1* | 3/2011 | Koushanfar | ............. | G09C 1/00 714/729 |
| 2011/0055851 A1* | 3/2011 | Potkonjak | ............. | H04L 9/0866 719/318 |
| 2013/0047209 A1* | 2/2013 | Satoh | ..................... | H04L 9/3278 726/2 |
| 2015/0195088 A1* | 7/2015 | Rostami | ................ | H04L 9/3278 380/28 |
| 2016/0156476 A1* | 6/2016 | Lee | ......................... | H04L 9/088 380/44 |
| 2018/0006830 A1* | 1/2018 | Cambou | ................. | G06F 21/73 |
| 2019/0044739 A1* | 2/2019 | Sachdev | ............... | H04L 9/3278 |
| 2019/0116052 A1* | 4/2019 | Kim | ...................... | H04L 9/3278 |
| 2021/0336804 A1* | 10/2021 | Parhi | .................... | H04L 9/0866 |

OTHER PUBLICATIONS

On Design of a Highly Secure PUF based on Non-Linear Current Mirrors (Year: 2014).*
Ganji et al., Why attackers win: On the learnability of XOR Arbiter PUFs, In Trust and Trustworthy Computing, Mauro Conti, Matthias Schunter, and Ioannis Askoxylakis (Eds.), Sprinter Int. Publishiing, Cham, 22-39,2015.
Majzoobi et al., Lightweight Secure PUFs, in IEEE/ACM International Conference on Computer-Aided Design, 2008, pp. 670-673.

(Continued)

*Primary Examiner* — Gary S Gracia
(74) *Attorney, Agent, or Firm* — Theodore M. Magee; Westman, Champlin & Koehler, P.A.

(57) ABSTRACT

An apparatus includes a first feed-forward PUF, a second feed-forward PUF and an exclusive-or circuit configured to perform an exclusive-or operation of an output of the first feed-forward PUF and an output of the second feed-forward PUF.

20 Claims, 19 Drawing Sheets

(56) References Cited

OTHER PUBLICATIONS

Zhou et al., "Secure and reliable XOR arbiter PUF design: An experimental study based on 1 trillion challenge response pair measurements," in Proceedings of Design Automation Conference (DAC), Jun. 2017, pp. 1-6.
Zhou et al., "Soft response generation and thresholding strategies for linear and feedforward MUX PUFs," in Proceedings of International Symposium on Low Power Electronics and Design (ISLPED), Aug. 2016.
Avvaru et al., "Effect of loop positions on reliability and attack resistance of feed-forward pufs," in Proc. of IEEE Computer Society Annual Symposium on VLSI (ISVLSI), Jul. 2019, pp. 287-290.
Avvaru et al., "Estimating delay differences of arbiter PUFs using silicon data," in Proceedings of Design, Automation and Test in Europe (DATE), Mar. 2016, pp. 543-546.
Avvaru et al., "Feed-forward XOR PUFs: Reliability and attack-resistance analysis," in Proc. of ACM Great Lakes Symposium on VLSI, May 2019, pp. 287-290.
Avvaru et al., "Predicting hard and soft-responses and identifying stable challenges of MUX PUFs using ANNs," in Proceedings of International Midwest Symposium on Circuits and Systems (MWSCAS), Aug. 2017, p. 934-937.
Ayling et al., "Not all feed-forward MUX PUFs generate unique signatures," in Proc. of IEEE Computer Society Annual Symposium on VLSI (ISVLSI), Jul. 2019, pp. 43-48.
Becker, "On the pitfalls of using arbiter-PUFs as building blocks," IEEE Transactions on Computer-Aided Design of Integrated Circuits and Systems, vol. 34, No. 8, pp. 1295-1307, Aug. 2015.
Becker, "The gap between promise and reality: On the insecurity of XOR arbiter PUFs," in Proc. International Workshop on Cryptographic Hardware and Embedded Systems, Sep. 2015, pp. 235-255.
Bhargava et al., "An efficient reliable PUF-based cryptographic key generator in 65nm CMOS," in Proceedings of the Conference on Design, Automation & Test in Europe, ser. Date '14. 3001 Leuven, Belgium, Belgium: European Design and Automation Association, 2014, pp. 70:1-70:6.
Bishop, Pattern Recognition and Machine Learning (Information Science and Statistics). Secaucus, NJ, USA: Springer-Verlag New York, Inc., 2006.
Delvaux et al., "Attacking PUF-based pattern matching key generators via helper data manipulation," in Topics in Cryptology—CT-RSA 2014, J. Benaloh, Ed. Cham: Springer International Publishing, 2014, pp. 106-131.
Delvaux, "Machine-learning attacks on PolyPUFs, OB-PUFs, RPUFs, LHS-PUFs, and PUF-FSMs," IEEE Transactions on Information Forensics and Security, vol. 14, No. 8, pp. 2043-2058, Aug. 2019.
Devadas et al., "Recombination of physical unclonable functions," in Government Microcircuit Applications and Critical Technology Conference (GOMACTech), Mar. 2010.
Gao et al., "Obfuscated challenge-response: A secure lightweight authentication mechanism for PUF-based pervasive devices," in Proc. IEEE International Conference on Pervasive Computing and Communication Workshops (PerCom Workshops), Mar. 2016, pp. 1-6.
Gassend et al., "Identification and authentication of integrated circuits: Research articles," Concurrency and Computation: Practice & Experience—Computer Security, vol. 16, No. 11, pp. 1077-1098, Sep. 2004. [Online], Available: http://dx.doi.org/10.1002/cpe.v16:11.
Gassend et al., "Silicon physical random functions," in Proceedings of the 9th ACM Conference on Computer and Communications Security, 2002, pp. 148-160.
Herder et al., "Physical unclonable functions and applications: A tutorial," in Proceedings of the IEEE, Aug. 2014, pp. 1126-1141.
Hospodar et al., "Machine learning attacks on 65nm arbiter PUFs: Accurate modeling poses strict bounds on usability," in Proceedings of IEEE International Workshop on Information Forensics and Security (WIFS), Dec. 2012, pp. 37-42.
Idriss et al., T. Idriss, and M. Bayoumi, "A highly reliable dual-arbiter PUF for lightweight authentication protocols," in 2017 IEEE International Conference on RFID Technology Application (RFID-TA), Sep. 2017, pp. 248-253.
Katzenbeisser et al., "Pufs: Myth, fact or busted? a security evaluation of physically unclonable functions (pufs) cast in silicon," in Proceedings of 14th International Workshop on Cryptographic Hardware and Embedded Systems (CHES), Sep. 2012, pp. 283-301.
Konigsmark et al., "PolyPUF: Physically secure self-divergence," Proceedings of IEEE Transactions on Computer-Aided Design of Integrated Circuits and Systems, vol. 35, No. 7, pp. 1053-1066, Jul. 2016.
Koyily et al., "Converting unstable challenges to stable in mux-based physical unclonable functions by bit-flipping," in Proceedings of Asilomar Conference on Signals, Systems and Computers, Nov. 2019.
Koyily et al., "Effect of aging on linear and nonlinear mux pufs by statistical modeling," in Proceedings of Asia and South Pacific Design Automation Conference (ASP-DAC), Jan. 2018, pp. 76-83.
Kumar et al., "Side-channel assisted modeling attacks on feed-forward arbiter PUFs using silicon data," in Intl. workshop on Radio Frequency Identification, S. Mangard and P. Schaumont, Eds. Springer International Publishing, 2015, pp. 53-67.
Lao et al. "Statistical analysis of MUX-based physical unclonable functions," IEEE Transactions on Computer-Aided Design of Integrated Circuits and Systems, vol. 33, No. 5, pp. 649-662, May 2014.
Lao et al., "Reconfigurable architectures for silicon physical unclonable functions," in Proceedings of IEEE International Conference on Elctro/Information Technology, May 2011, pp. 1-7.
Lee et al., "A technique to build a secret key in integrated circuits for identification and authentication applications," in Symposium on VLSI Circuits Digest of Technical Papers, Jun. 2004, pp. 176-179.
Lim et al., "Extracting secret keys from integrated circuits," IEEE Transactions on Very Large Scale Integration (VLSI) Systems, vol. 13, No. 10, pp. 1200-1205, Oct. 2005.
Mahmoud et al., "Combined modeling and side channel attacks on strong pufs," IACR Cryptology ePrint Archive, vol. 2013, p. 632, 2013.
Maiti et al., "A systematic method to evaluate and compare the performance of physical unclonable functions," IACR Cryptology ePrint Archive, vol. 2011, p. 657, 2011.
Majzoobi et al., "FPGA PUFusing programmable delay lines," in IEEE International Workshop on Information Forensics and Security, Dec. 2010, pp. 1-6.
Morozov et al., "An analysis of delay based PUF implementations on FPGA," in Reconfigurable Computing: Architectures, Tools and Applications, P. Sirisuk, F. Morgan, T. El-Ghazawi, and H. Amano, Eds. Berlin, Heidelberg: Springer Berlin Heidelberg, 2010, pp. 382-387.
Nguyen et al., "The interpose PUF: Secure PUF design against state-of-the-art machine learning attacks," IACR Cryptology ePrint Archive, vol. 2018, p. 350, 2018.
Riedmiller et al., "A direct adaptive method for faster backpropagation learning: the RPROP algorithm," in Proc. IEEE International Conference on Neural Networks, 1993, pp. 586-591.
Ruhrmair et al., "Efficient power and timing side channels for physical unclonable functions," in Proc. Cryptographic Hardware and Embedded Systems—Ches, L. Batina and M. Robshaw, Eds. Berlin, Heidelberg: Springer Berlin Heidelberg, 2014, pp. 476-492.
Ruhrmair et al., "Modeling attacks on physical unclonable functions," in Proc, the 17th ACM Conference on Computer and Communications Security, ser CCS '10. New York, NY, USA: ACM, 2010, pp. 237-249.
Ruhrmair et al., "PUF modeling attacks on simulated and silicon data," IEEE Transactions on Information Forensics and Security, vol. 8, No. 11, pp. 1876-1891, Nov. 2013.
Sahoo et a., "A multiplexer-based arbiter puf composition with enhanced reliability and security," IEEE Transactions on Computers, vol. 67, No. 3, pp. 403-417, Mar. 2018.

(56) References Cited

OTHER PUBLICATIONS

Sahoo et al., "Towards ideal arbiter PUFdesign on xilinx FPGA: A practitioner's perspective," in Euromicro Conference an Digital System Design, Aug. 2015, pp. 559-562.

Santikellur et al., "Deep learning based model building attacks on arbiter puf compositions," IACR Cryptology ePrint Archive, vol. 2019, p. 566, 2019.

Schaub et al., "An improved analysis of reliability and entropy for delay pufs," in Proceedings of Euromicro Conference an Digital System Design (DSD), Aug. 2018, pp. 553-560.

Suh et al. "Physical unclonable functions for device authentication and secret key generation," in Proceedings of ACM/IEEE Design Automation Conference, Jun. 2007.

Tajik et al., "Physical characterization of arbiter PUFs," in Proceedings of Cryptographic Hardware and Embedded Systems (CHES), L. Batina and M. Robshaw, Eds. Berlin, Heidelberg: Springer Berlin Heidelberg, 2014, pp. 493-509.

Wang et al., "Design and analysis of stability-guaranteed PUFs," IEEE Transactions on Information Forensics and Security, vol. 13, No. 4, pp. 978-992, Apr. 2018.

Wen "Enhancing PUFreliability by machine learning," in Proceedings of IEEE International Symposium on Circuits and Systems (ISCAS), May 2017, pp. 1-4.

Xu et al., "Using statistical models to improve the reliability of delay-based PUFs," in Proceedings of IEEE Computer Society Annual Symposium on VLSI, Jul. 2016, pp. 547-552.

Ye et al., "RPUF: Physical unclonable function with randomized challenge to resist modeling attack," in Proceedings of IEEE Asian Hardware-Oriented Security and Trust (AsianHOST), Dec. 2016, pp. 1-6.

Yin et al. "LISA: Maximizing RO PUF's secret extraction," in Proceedings of IEEE International Symposium on Hardware-Oriented Security and Trust (HOST), Jun. 2010, pp. 100-105.

Yu et al., "A lockdown technique to prevent machine learning on PUFs for lightweight authentication," IEEE Transactions on Multi-Scale Computing Systems, vol. 2, No. 3, pp. 146-159, Jul. 2016.

Yu et al., "Secure and robust error correction for physical unclonable functions," IEEE Design Test of Computers, vol. 27, No. 1, pp. 48-65, Jan. 2010.

Zalivaka et al., "Reliable and modeling attack resistant authentication of arbiter PUF in FPGA implementation with trinary quadruple response," IEEE Transactions on Information Forensics and Security, vol. 14, No. 4, pp. 1109-1123, Apr. 2019.

\* cited by examiner

TABLE III

| Design Num. | $N_{add}/N_{loops}$ | FF Loops Locations | Noise Level = 5% | | | Noise Level = 10% | | | Noise Level = 15% | | |
|---|---|---|---|---|---|---|---|---|---|---|---|
| | | | % Stable | Rel.(%) Before | Rel.(%) After | % Stable | Rel.(%) Before | Rel.(%) After | % Stable | Rel.(%) Before | Rel.(%) After |
| A | 0/0 | - | 65.5 | 84.63 | 97.36 | 40.69 | 73.48 | 95.26 | 23.86 | 65.67 | 93.45 |
| B | 1/1 | 10 → 40 | 52.1 | 78.65 | 96.2 | 24.73 | 66.09 | 93.46 | 10.65 | 58.93 | 91.26 |
| B* | 1/2 | 10 → 40, 41 (MFF) | 63.78 | 83.98 | 97.21 | 38.94 | 72.63 | 94.95 | 22.62 | 65.18 | 93.09 |
| C | 1/2 | 10 → 30, 40 | 58.45 | 81.35 | 96.75 | 32.07 | 69.67 | 94.25 | 16.54 | 62.4 | 92.41 |
| D | 1/3 | 10 → 30, 40, 50 | 52.14 | 78.66 | 96.26 | 24.65 | 65.99 | 93.41 | 10.3 | 59.07 | 91.34 |
| C* | 1/4 | 10 → 30, 31, 40, 41 | 62.74 | 83.27 | 97.18 | 37.70 | 72.21 | 94.82 | 21.45 | 64.58 | 92.86 |
| E | 1/4 | 10 → 20, 30, 40, 50 | 54.85 | 79.92 | 96.43 | 27.73 | 67.61 | 93.76 | 12.85 | 60.16 | 91.75 |
| F | 1/5 | 10 → 20, 30, 40, 50, 60 | 52.34 | 78.74 | 96.15 | 24.61 | 66.37 | 93.37 | 10.6 | 59.03 | 91.28 |
| D* | 1/6 | 10 → 30, 31, 40, 41, 50, 51 | 61.85 | 83.12 | 97.1 | 36.64 | 71.79 | 94.75 | 20.61 | 64.26 | 92.7 |
| G | 1/6 | 10 → 30, 35, 40, 45, 50, 55 | 56.52 | 80.49 | 96.52 | 29.44 | 68.44 | 94 | 14.35 | 61.11 | 91.96 |
| E* | 1/8 | 10 → 20, 21, 30, 31, 40, 41, 50, 51 | 61.43 | 82.72 | 96.96 | 35.76 | 71.52 | 94.59 | 19.74 | 63.93 | 92.72 |
| H | 1/8 | 10 → 20, 25, 30, 35, 40, 45, 50, 55 | 54.82 | 79.67 | 96.51 | 27.35 | 67.48 | 93.79 | 20.73 | 60.39 | 91.68 |
| I | 4/4 | 10 → 20, 15 → 30, 25 → 40, 35 → 50 | 33.47 | 70.40 | 94.66 | 9.08 | 58.74 | 91.44 | 2.72 | 53.42 | 89.5 |
| I* | 4/8 | 20 → 20, 21; 15 → 30, 31; 25 → 40, 41; 35 → 50, 51 | 57.73 | 81.14 | 96.75 | 33.09 | 70.04 | 94.30 | 18.16 | 63.92 | 92.56 |
| J | 4/4 | 15 → 55; 20 → 50; 25 → 45; 30 → 40 | 26.17 | 66.22 | 94.01 | 6.16 | 56.21 | 90.89 | 1.45 | 52.48 | 88.60 |
| J* | 4/8 | 15 → 55, 56; 20 → 50, 51; 25 → 45, 46; 30 → 40, 41 | 58.05 | 81.36 | 96.85 | 33.36 | 70.18 | 94.52 | 18.36 | 63.32 | 92.58 |

*The FF loops are replaced with modified FF loops.

FIG. 18

FEED-FORWARD XOR PHYSICAL UNCLONABLE FUNCTIONS

This invention was made with Government support under CNS-1441639 awarded by the National Science Foundation. The Government has certain rights in this invention.

BACKGROUND

Physical Unclonable Functions (PUFs) are integrated circuits that are used to securely authenticate devices or generate cryptographic keys without using non-volatile memories. PUFs harvest natural randomness in manufacturing process variations in order to generate random yet unique bits. With embedded devices becoming more ubiquitous, these low-power, low-area and low-cost hardware security primitives have received extensive attention in research and commercial communities. PUFs can be categorized as strong or weak PUFs based on whether the number of unique input challenges is large or small, respectively. Unpredictability, reliability, uniqueness and randomness are fundamental characteristics of PUFs. Two of the biggest issues that strong PUFs face are low reliability and vulnerability to attacks. Unpredictability ensures resilience against cloning attacks. One major issue with standard PUFs is that these can be described by linear models which can be learned easily.

The discussion above is merely provided for general background information and is not intended to be used as an aid in determining the scope of the claimed subject matter. The claimed subject matter is not limited to implementations that solve any or all disadvantages noted in the background.

SUMMARY

An apparatus includes a first feed-forward PUF, a second feed-forward PUF and an exclusive-or circuit configured to perform an exclusive-or operation of an output of the first feed-forward PUF and an output of the second feed-forward PUF.

In accordance with a further embodiment, a method includes executing a first feed-forward PUF to produce a first response, executing a second feed-forward PUF to produce a second response and applying the first response and the second response to an exclusive-or circuit to produce an XOR response.

In a still further embodiment, an integrated circuit includes a plurality of feed-forward PUFs, each providing a separate response and an exclusive-or circuit applying an exclusive-or operation to the separate responses to produce an exclusive-or response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11(*b*) shows graphs of FPGA interchip variation as a function of PUF component levels for different FFXOR configurations.

FIG. 12(*b*) shows graphs of prediction accuracy as a function of numbers of challenge-response pairs for different numbers of feed-forward components.

FIG. 14(*b*) shows graphs of reliability for different numbers of feed-forward components.

FIG. 18 is a table showing reliability improvements with using soft thresholding for various feed-forward configurations.

DETAILED DESCRIPTION

Arbiter PUFs

Figure 1:
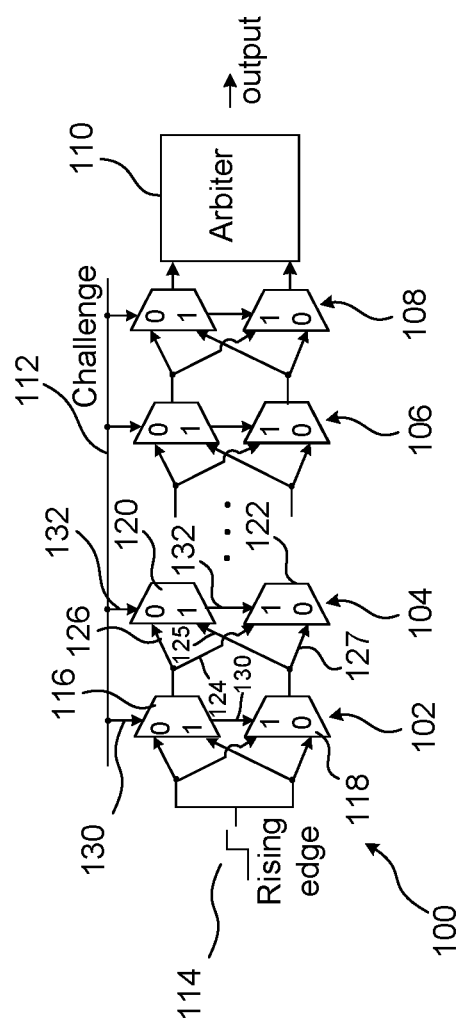
FIG. 1 is a block diagram of a standard PUF.

Arbiter PUFs are delay-based PUFs that use an arbiter circuit to compare path delays of the circuit. FIG. 1 shows the structure of a standard arbiter PUF 100 that includes a sequence of Multiplexer (MUX) stages 102, 104, 106, and 108 ending at an arbiter 110. Each MUX stage has two multiplexers that each receives a same control bit. For example multiplexers 116 and 118 of stage 102 receive control bit 130 and multiplexers 120 and 122 of MUX stage 104 receive control bit 132. Together, the control bits applied to the MUX stages form a challenge 112. The values of the control bits in challenge 112 define two parallel paths through the MUX stages. For example, when control bit 132 has a value of '0', multiplexers 120 and 122 both pass the value at their 0 input to their output thereby creating paths 126 and 127. On the other hand, when control bit 132 has a value of '1', multiplexers 120 and 122 both pass the value at their '1' input to their output thereby creating paths 124 and 125.

When a positive going edge is applied as a signal 114 to all of the inputs of multiplexers 116 and 118 in first stage 102, the positive going edge traverses the two paths defined by challenge 112, eventually reaching arbiter 110. Because of differences in the two parallel paths, the positive going edge reaches arbiter 110 at different times on the different paths. Arbiter 110 latches an output value that reflects which of paths provided the positive going edge first. One example of an arbiter is a latch with one MUX of the last MUX stage connected to the data input of the latch and the other MUX of the last MUX stage connected to the clock input of the latch.

Each multiplexer has an intrinsic delay characterized by a Gaussian distribution. Thus, each stage contributes a delay difference to the overall path delay difference between the two competing paths. The input/output mapping of a standard arbiter PUF can be described by an additive linear delay model, which assumes that the overall delay difference of the two parallel paths is the sum (or difference) of the path delay differences at each stage. Mathematically, the overall path delay difference, Δ, for an N-stage PUF is given by:

$$\Delta = \Sigma_{i+1}^{N} \Delta_i (-1)^{X_i}, \quad (1)$$

where $\Delta_i$ is the path delay difference at stage i and $X_i = C_{i+1} \oplus C_{i+2} \oplus \ldots \oplus C_N$. Each arbiter has an intrinsic skew that indicates the minimum timing difference that the arbiter can detect. If the arbiter skew is denoted by $\Delta_{Arb}$, the response (output) of the PUF is considered 0 or 1, depending on whether $\Delta \leq \Delta_{Arb}$ or $\Delta > \Delta_{Arb}$, respectively. The ability to model arbiter PUFs as linear models makes it susceptible to modeling attacks where an attacker could build a software clone of the PUF.

Feed-Forward Arbiter PUFs

To make arbiter PUFs more secure, feed-forward PUFs (FF PUFs) have been proposed. In the case of FF PUFs, an additional intermediate arbiter (feed-forward arbiter) is used to determine the response of one of the intermediate stages which is then used as a challenge bit for one (or more) of the following MUX stages. Multiple such intermediate arbiters can also be used. This structure improves security by introducing non-linearity into the system, making it harder for an attacker to build a predictive model The MUX stage used as input to the arbiter, the arbiter itself, and the MUX stage(s) controlled by the arbiter are referred to as a feed-forward loop.

Figure 2:
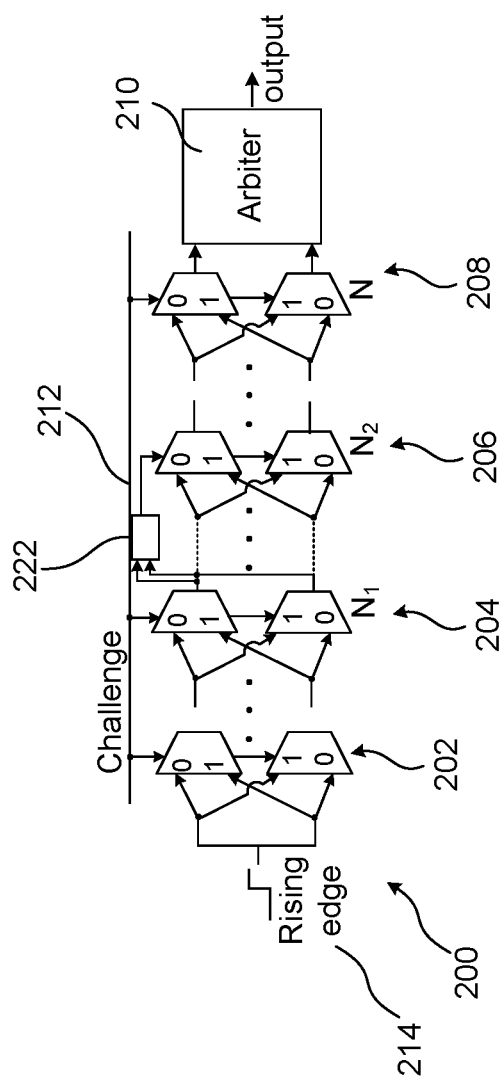
FIG. 2 is a block diagram of a feed-forward PUF with a single intermediate arbiter.

An example of a feed-forward PUF 200 is shown in FIG. 2. FF PUF 200 includes a sequence of MUX stages 202, 204, 206 and 208 that define two parallel paths leading to an arbiter 210, which provides an output indicative of which path provided a positive going edge 214 first. Each MUX stage has two multiplexers that each receive a same control bit provided to the MUX stage. Instead of all of the control bits coming from a challenge 212, the control bit for MUX stage 206 comes from an intermediate arbiter 222, which latches its output to reflect which of the outputs of MUX stage 204 provided the positive going edge 214 first. MUX stages 204 and 206 can be next to each other or can be separated from each other by one or more intervening MUX stages. Although arbiter 222 is shown connected to the outputs of MUX stage 204, arbiter 222 can be connected to the outputs of any MUX stage before the final MUX stage in the sequence. Together, MUX 204, arbiter 222 and mux 206 form a feed-forward loop.

Figure 3:
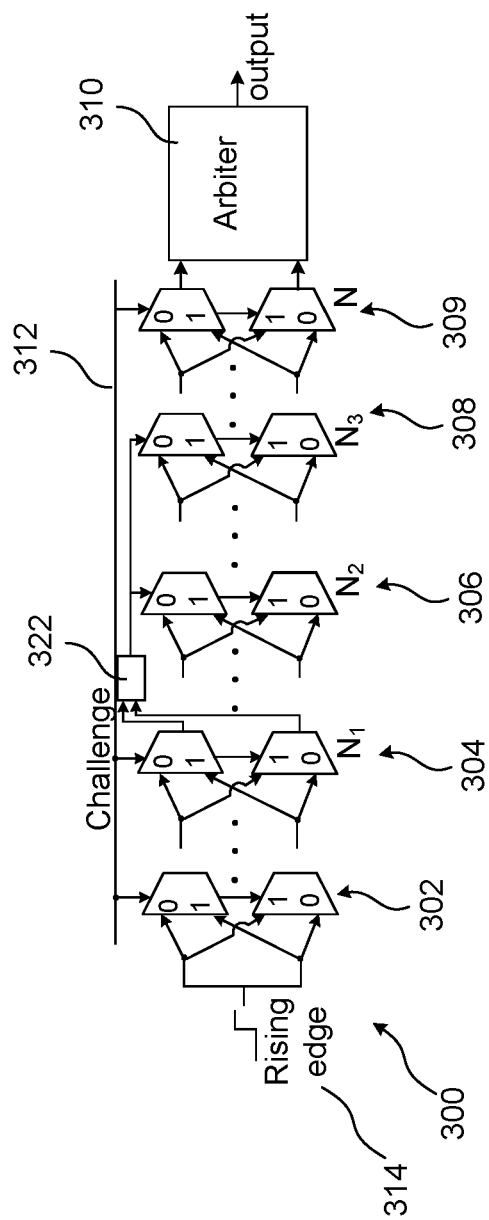
FIG. 3 is a block diagram of a modified feed-forward PUF.

An example of a feed-forward PUF 300, known as a modified feed-forward PUF, is shown in FIG. 3. FF PUF 300 includes a sequence of MUX stages 302, 304, 306, 308 and 309 that define two parallel paths leading to an arbiter 310, which provides an output indicative of which path provided a positive going edge 314 first. Each MUX stage has two multiplexers that each receive a same control bit provided to the MUX stage. Instead of all of the control bits coming from a challenge 312, the control bits for MUX stage 306 and 308 come from an intermediate arbiter 322, which latches its output to reflect which of the outputs of MUX stage 304 provided the positive going edge 314 first. MUX stages 304 and 306 can be next to each other or can be separated from each other by one or more intervening MUX stages. In order to be considered a modified feed-forward PUF, MUX stages 306 and 308 must be next to each other in the sequence. Although arbiter 322 is shown connected to the outputs of MUX stage 304, arbiter 322 can be connected to the outputs of any MUX stage except for the last two MUX stages in the sequence. Together, MUX 304, arbiter 322, MUX 304 and MUX 306 constitute a modified feed-forward loop.

Figure 4:
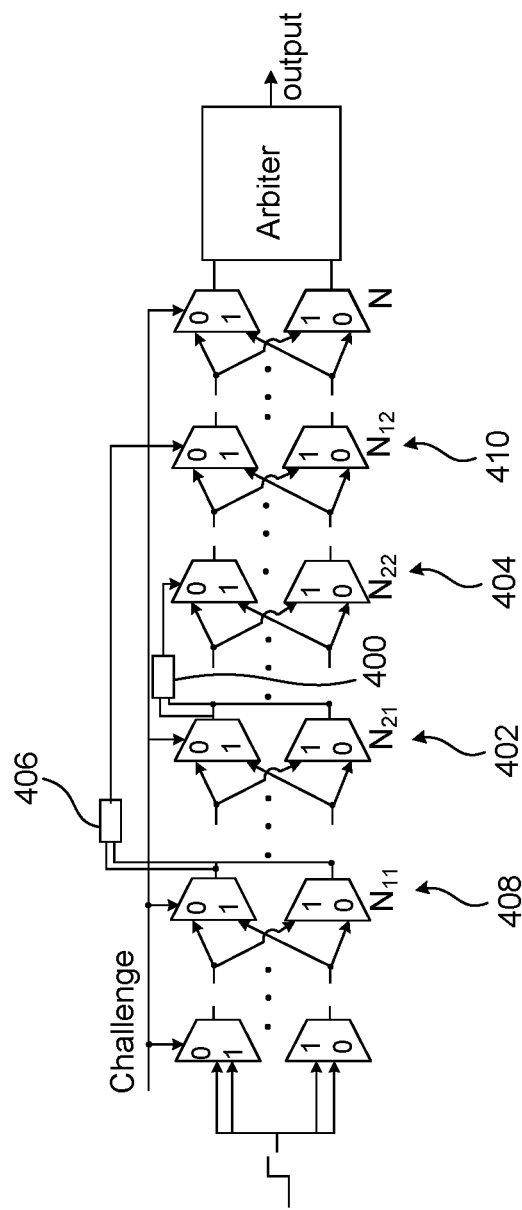
FIG. 4 is a block diagram of a feed-forward PUF in a nested configuration.

In other embodiments, multiple intermediate arbiters are used to provide control bits to MUX stages in the feed-forward PUF. These embodiments include many different configurations. For example, FIG. 4 shows a nested configuration in which an intermediate arbiter 400 provides a control bit to a MUX stage 404 based on the outputs of a MUX stage 402 and an intermediate arbiter 406 provides a control bit to a MUX stage 410 based on the outputs of a MUX stage 408. The configuration is considered to be nested in that both MUX stage 402 and MUX stage 404 are between MUX stage 408 and MUX stage 410. MUX stages 402 and 404 can be next to each other or can be separated by one or more intervening MUX stages. MUX stage 402, arbiter 404 and MUX stage 404 form a first feed-forward loop and MUX stage 408, arbiter 406, and MUX stage 410 form a second feed-forward loop.

Figure 5:
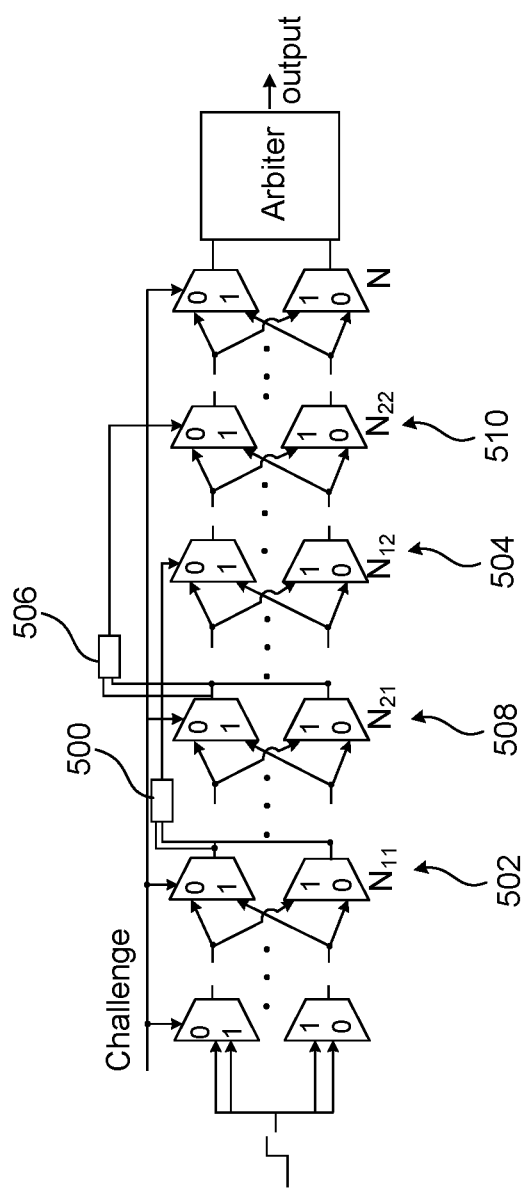
FIG. 5 is a block diagram of a feed-forward PUF in an overlapped configuration.

FIG. 5 shows an overlapping configuration in which an arbiter 500 provides a control bit to a MUX stage 504 based on the outputs of a MUX stage 502 and an intermediate arbiter 506 provides a control bit to a MUX stage 510 based on the outputs of a MUX stage 508. The configuration is considered to be overlapping because only MUX stage 508 is between MUX stages 502 and 504 while MUX stage 510 is positioned after MUX stage 504. MUX stage 502, arbiter 500 and MUX stage 504 form a first feed-forward loop and MUX stage 508, arbiter 506, and MUX stage 510 form a second feed-forward loop.

Figure 6:
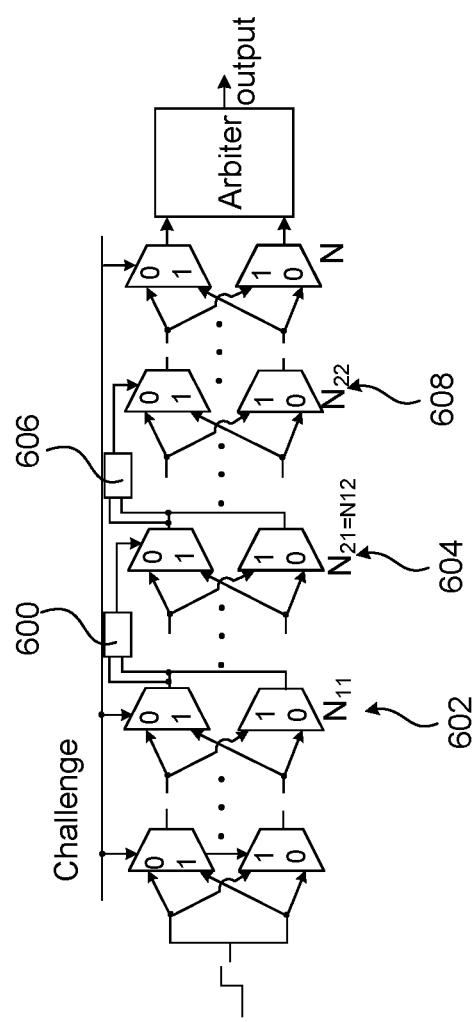
FIG. 6 is a block diagram of a feed-forward PUF in a cascade configuration.

FIG. 6 shows a cascading configuration in which an intermediate arbiter 600 provides a control bit to a MUX stage 604 based on the outputs of a MUX stage 602 and an intermediate arbiter 606 provides a control bit to a MUX stage 608 based on the outputs of MUX stage 604. The configuration is considered to be cascading because MUX stage 604 both receives a control bit from an intermediate arbiter and provides its output to a second intermediate arbiter. MUX stages 602 and 604 can be next to each other or can be separated from each other by one or more intervening MUX stages. Similarly, MUX stages 604 and 608 can be next to each other or can be separated from each other by one or more intervening MUX stages. MUX stage 602, arbiter 600 and MUX stage 604 form a first feed-forward loop and MUX stage 604, arbiter 606, and MUX stage 608 form a second feed-forward loop.

Figure 7:
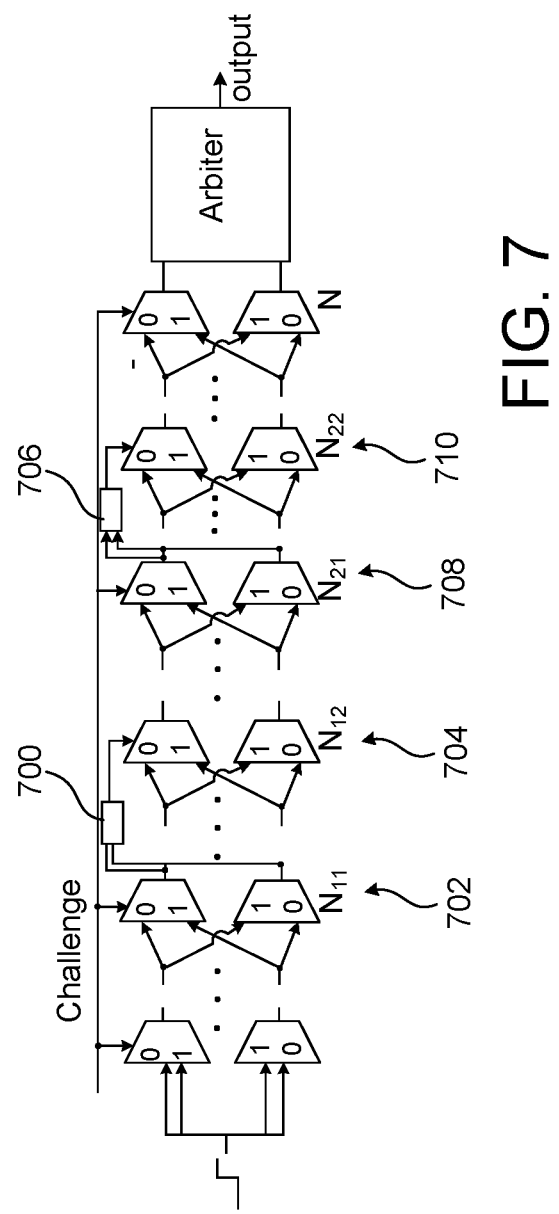
FIG. 7 is a block diagram of a feed-forward PUF in a separate configuration.

FIG. 7 shows a separate configuration in which an intermediate arbiter 700 provides a control bit to a MUX stage 704 based on the outputs of a MUX stage 702 and an intermediate arbiter 706 provides a control bit to a MUX stage 710 based on the outputs of a MUX stage 708. The configuration is considered to be separate because MUX stage 704 is before MUX stage 708. MUX stages 702 and 704 can be next to each other or can be separated from each other by one or more intervening MUX stages. Similarly, MUX stages 706 and 710 can be next to each other or can be separated from each other by one or more intervening MUX stages. MUX stage 702, arbiter 700 and MUX stage 74 form a first feed-forward loop and MUX stage 708, arbiter 706, and MUX stage 710 form a second feed-forward loop.

PUFs are evaluated in terms of 4 fundamental performance metrics: uniqueness, security, reliability and randomness.

Two different PUFs with identical designs are said to be unique if they generate unique response signatures for the same set of challenges. Having unique responses to the same challenge is a key feature of PUFs and is what makes the function unclonable. However, it has been shown that the uniqueness of feed-forward PUFs is lower than standard arbiter PUFs.

In particular, it has been observed that when one intermediate arbiter is used, if the intermediate response is connected to an odd number of stages, the PUFs are not unique and hence should be avoided. Moreover, for PUFs with two intermediate arbiters it is advisable to avoid overlap and nested configurations for the same reason.

To overcome these problems, the present embodiments use multiple feed-forward PUFs and XOR the outputs of the feed-forward PUFs to provide a single FFXOR PUF output in response to a challenge. The number of component feed-forward PUFs that are XOR-ed together is referred to as the number of levels in the FFXOR PUF. Embodiments include two variants: homogeneous FFXOR PUFs and heterogeneous FFXOR PUFs. This distinction is important because the properties of the XOR PUFs may change depending on the structure of the component PUFs.

Figure 8:
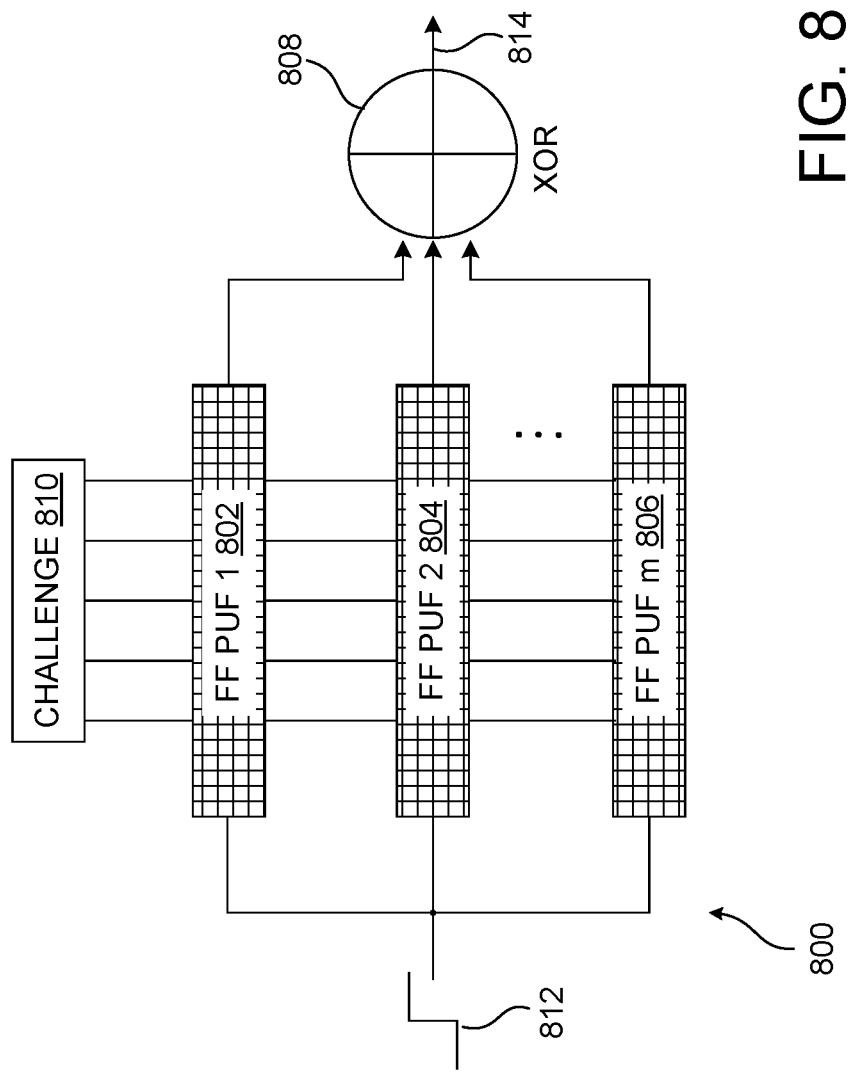
FIG. 8 is a block diagram of a homogenous feed-forward XOR PUF.

1) Homogeneous FFXOR PUFs are FFXOR PUFs where every component PUF has an identical design. That is, the intermediate arbiters are connected to the same MUX stages in the same manner in each of the component PUFs. FIG. 8 provides a block diagram of a homogeneous FFXOR PUF 800 that includes m identically structured feed-forward PUFs, such as feed-forward PUFs 802, 804 and 806, that each receive a challenge 810 and a positive going pulse 812 and that have their outputs combined by an XOR 808 to provide an XOR result 814. Since the feed-forward PUFs have the same structure and receive the same challenge, the feed-forward PUFs provide the same paths through their respective MUX stages. In addition, the FF PUFs are expected to have similar reliability and uniqueness properties.

Figure 9:
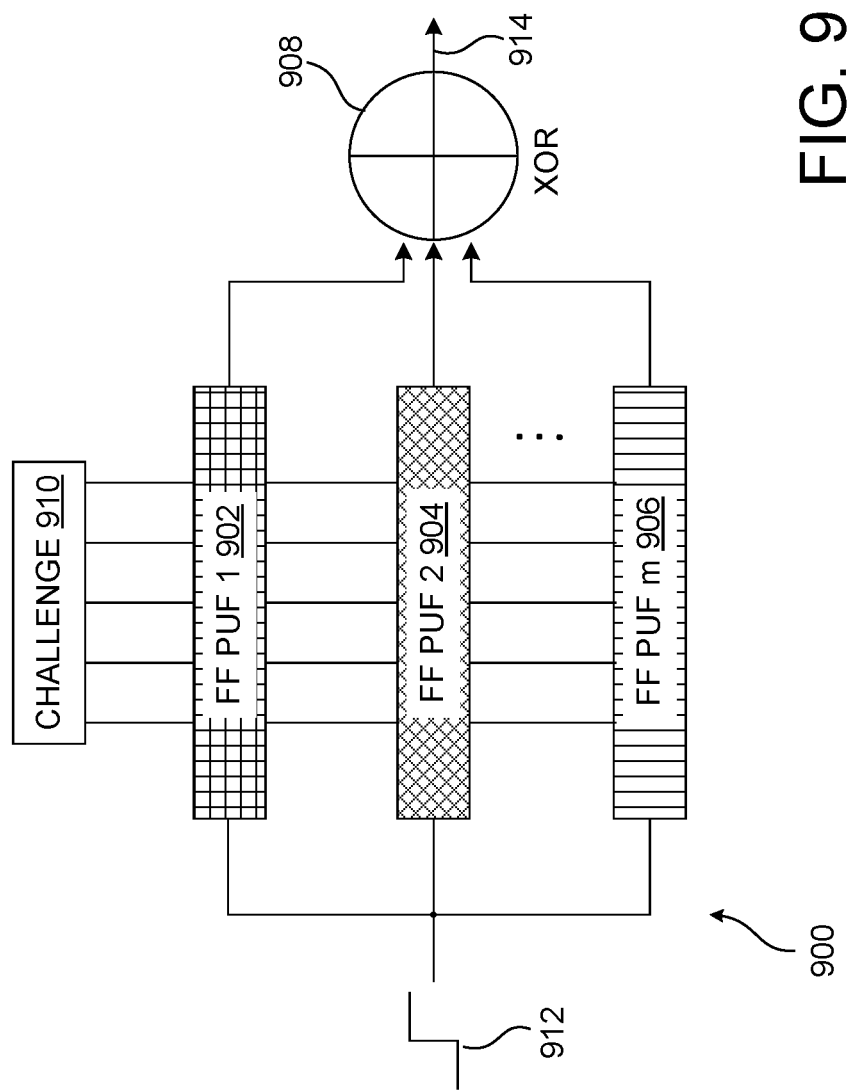
FIG. 9 is a block diagram of a heterogenous feed-forward XOR PUF.

2) Heterogeneous FFXOR PUFs are composed of FF PUFs with different designs. The differences in design can include differences in one or more of the number of MUX stages, the number of intermediate arbiters, the MUX stage that the input of an arbiter is connected to, the MUX stage(s) that receives the output of an arbiter as a control bit, and the design configuration(s) such as nested, overlap, cascade and separate of the feed-forward loops in the FF PUFs. FIG. 9 provides a block diagram of a heterogeneous FFXOR PUF 900 that includes m structurally different feed-forward PUFs, such as feed-forward PUFs 902, 904 and 906, that each receive a challenge 910 and a positive going pulse 912 and that have their outputs combined by an XOR 908 to provide an XOR result 914. Although the same challenge 910 is provided to each feed-forward PUF, the individual control bits of challenge 910 are applied differently in each feed-forward PUF due to the structural differences between the PUFs. For example, a bit in challenge 910 that is used to control a MUX stage in one feed-forward PUF is not used by another feed-forward PUF or a bit in challenge 910 is used to control different MUX stages in different feed-forward PUFs.

Uniqueness Analysis

When a set of randomly chosen challenges is provided as input to a PUF, it generates a set of responses. This response vector, known as the digital signature of the PUF, is used for authentication. For a PUF to be unique, it is expected that the responses generated by two PUFs with the same structure are unique. Interchip variation ($P_{inter}$) is a statistical metric used to quantify the uniqueness of a PUF design. Statistically, it can be defined as the probability that two randomly chosen PUFs generate different responses for the same challenge. If $P(R=1)$ is the probability of the response being 1, then $P_{inter}$ can be expressed as $$P_{inter}=2P(R=1)(1-P(R=1)) \quad (2)$$

$P_{inter}$ is a value that ranges from 0 to 1. Values of $P_{inter}$ close to 0.5 are desirable and values close to 0 or 1 imply that the PUFs are not unique. Accordingly, uniqueness can be defined as $$\text{Uniqueness}=(1-|2P_{inter}-1|)\times 100\% \quad (3)$$

As noted above, some feed-forward PUFs have poor uniqueness. This section proves that the FFXOR PUFs of the present embodiments provide signatures with high uniqueness independent of the uniqueness of the component PUFs.

A. Mathematical Derivation

If a given challenge is evaluated on a set of PUFs with identical design, the response can be characterized as a Bernoulli random variable with success probability p. If the structure is unique, then the responses are unbiased, i.e., p=0:5. In certain FF PUFs, p can be less than or greater than 0.5 as a result of biased path delays in the circuit. However, when the responses of FF PUFs are XOR-ed, the resultant response of the FFXOR PUF depends only on the number of 0's and 1's among the component PUFs. That is, if an odd number of component PUFs evaluate to a response of 1, the XOR-ed response is a 1, regardless of the responses of the specific component PUFs. Thus, the bias in the component FF PUFs can be alleviated by XORing them together. In other words, as the number of components increases, the responses become unique even if the component PUFs are not unique.

Consider a FFXOR PUF with m FF PUFs as the components. For a given challenge, let the responses of the component PUFs be $y_1, y_2, \ldots, y_m$. Therefore, the response R of the FFXOR PUF can be computed as $R=y_1 \oplus y_2 \oplus \ldots \oplus y_m$. To study the uniqueness of a design, $P(R=1)$ has to be computed, where R is the response of FFXOR PUFs. We know that R is 1 if and only if odd number of component PUFs have a response of 1. In other words, the sum of the responses, $y_1+y_2+\ldots+y_m$ should be an odd number. Let Y be the random variable representing the sum of the responses of the components. It can be noted that Y follows a binomial distribution with parameters m and p. Hence, $P(R=1)$ and $P(R=0)$ are given by the equations:

$$P(R=1) = P(Y \text{ odd}) = \sum_{k=0}^{\lfloor (m-1)/2 \rfloor} \binom{m}{2k+1} p^{2k+1}(1-p)^{m-2k-1} \quad (4)$$

$$P(R=0) = P(Y \text{ even}) = \sum_{k=0}^{\lfloor m/2 \rfloor} \binom{m}{2k} p^{2k}(1-p)^{m-2k}$$

According to the Binomial Theorem, $(p+(1-p))^m$ can be expanded as $$(p + (1 - p))^m = \sum_{k=0}^{m} \binom{m}{k} p^k (1-p)^{m-k} \quad (5)$$

$$= \sum_{k=0}^{\lfloor m/2 \rfloor} \binom{m}{2k} p^{2k} (1-p)^{m-2k} +$$

$$\sum_{k=0}^{\lfloor (m-1)/2 \rfloor} \binom{m}{2k+1} p^{2k+1} (1-p)^{m-2k-1}$$

$$= P(Y \text{ even}) + P(Y \text{ odd}) = 1$$

Similarly, $$(-p + (1 - p))^m = \sum_{k=0}^{m} \binom{m}{k} (-p)^k (1-p)^{m-k} \quad (6)$$

$$= \sum_{k=0}^{\lfloor m/2 \rfloor} \binom{m}{2k} p^{2k} (1-p)^{m-2k} -$$

$$\sum_{k=0}^{\lfloor (m-1)/2 \rfloor} \binom{m}{2k+1} p^{2k+1} (1-p)^{m-2k-1}$$

$$= P(Y \text{ even}) - P(Y \text{ odd})$$

From (5) and (6), it can be concluded that $$P(R = 1) = P(Y \text{ odd}) = \frac{1 - (1 - 2p)^m}{2} \quad (7)$$

A PUF configuration is said to be unique if its $P_{inter}$=50%. Using Eq (2), the interchip variation can now be computed as a function of p and m:

$$P_{inter} = \frac{1 - (1 - 2p)^{2m}}{2} \quad (8)$$

Figure 10:
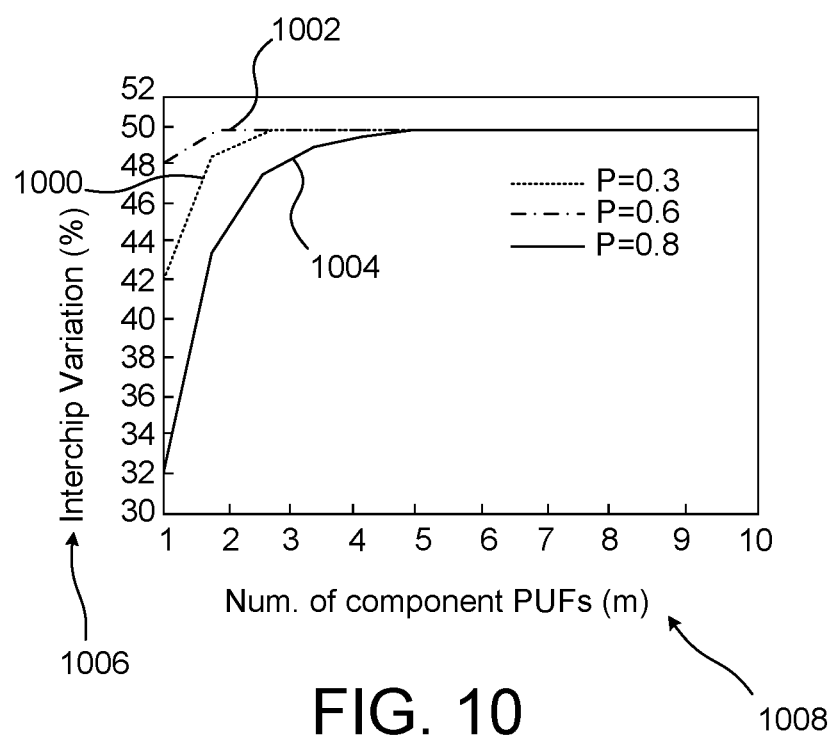
FIG. 10 shows graphs of interchip variation as a function of PUF component levels.

When the component PUFs are unique, i.e., when p=1/2, P(R=1)=1/2 (regardless of the value of m). More importantly, even when p≠1/2, P(R=1) approaches 0.5 as m increases. Consequently $P_{inter}$ approaches 50% as illustrated in FIG. 10. Specifically, FIG. 10 shows three graphs of $P_{inter}$ 1000, 1002, and 1004 for respective p values of 0.3, 0.6 and 0.8, with interchip variation shown along vertical axis 1006 and the number of feed-forward PUFs, m, shown along horizontal axis 1008.

B. Results

Interchip variation of FF PUFs is affected by the position of the final intermediate arbiter. The interchip variation deteriorates as the intermediate arbiter is placed closer to the output stage—N-th stage for an N-stage PUF. For example, 64-bit FF PUFs with an intermediate arbiter at the 10th stage have better interchip variation compared to FF PUFs with the intermediate arbiter at the 50th stage. To observe the effect of XOR-ing, four variants of FFXOR PUFs with intermediate arbiters at different locations were analyzed.

Figure 11:
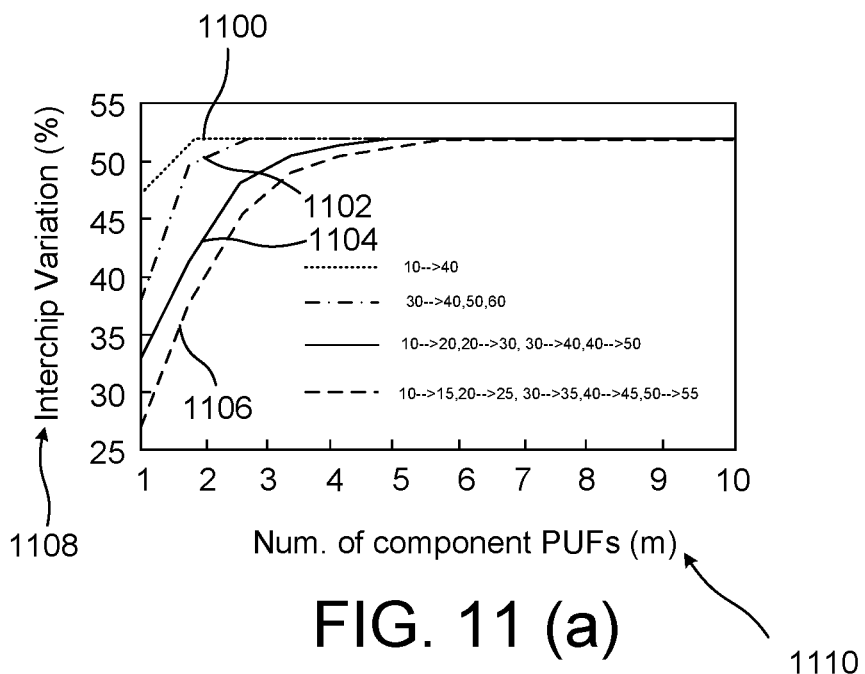
FIG. 11(*a*) shows graphs of simulated interchip variation as a function of PUF component levels for different FFXOR configurations.
Figure 11:
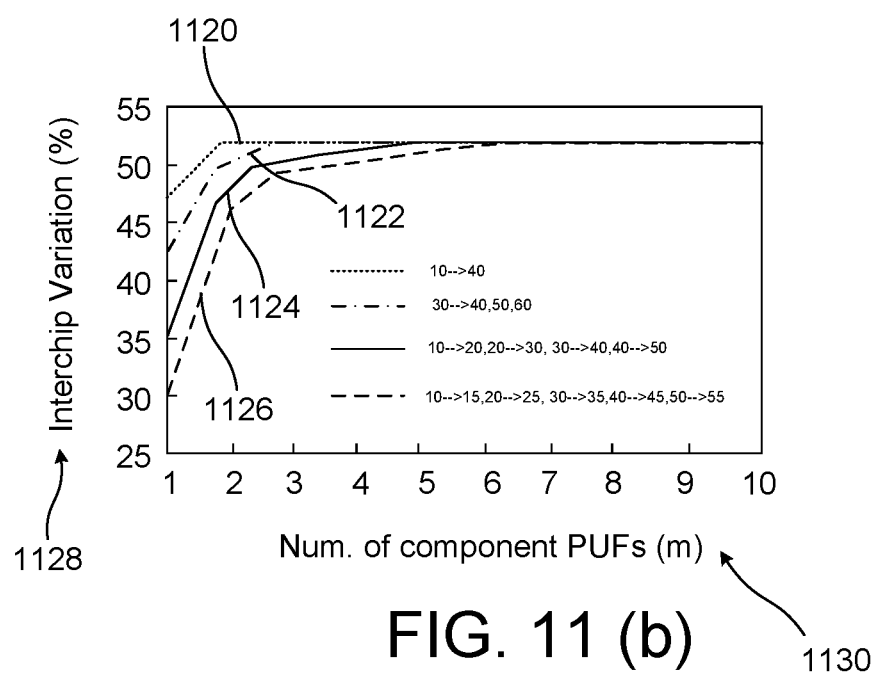

These designs were simulated and their interchip variations were computed using Eq (2). FIG. 11(a) shows graphs 1100, 1102, 1104, and 1106 of $P_{inter}$ (vertical axis 1108) as a function of the number of feed-forward PUFs, m (horizontal axis 1110), for four different respective feed-forward PUF configurations. Graphs 1100 and 1102 are for configurations that have one intermediate arbiter placed at stage 10 and 30, respectively. The corresponding intermediate response is connected to stage 40 for the configuration of graph 1100 and to stages 40, 50 and 60 for the configuration of graph 1102. Graph 1104 is for a third configuration that has four intermediate arbiters that are arranged in a cascade formation beginning at stage 10 and providing control bits to stages 20, 30, 40 and 50. Graph 1106 is for a configuration with five intermediate arbiters with the final one at stage 50. Here the arbiters are arranged in a separate configuration. It can be observed in all the cases that $P_{inter}$ rapidly approaches 50% as m increases. It should be noted that m=1 corresponds to the component PUFs. The results show that even if PUFs with just 27% interchip variation are used as components, the resultant XOR PUF attains an interchip variation of approximately 50% when at least 5 components are used.

Additionally, eight instances of these designs were implemented on FPGA and the interchip variation was computed using:

$$E(HD_{inter}) = P_{inter} = \frac{2}{(K-1)K} \sum_{i=1}^{K-1} \sum_{j=i+1}^{K} \frac{HD(R(i), R(j))}{L} \quad (9)$$

where HD is the Hamming Distance, R(i) and R(j) are L-bit digital signatures of PUFs i and j, and K is the number of instances of the FFXOR PUFs, which for this experiment is K=8. The results of these FPGA experiments are presented in FIG. 11(b) for the four FFXOR configurations discussed above for FIG. 11(a). In particular, graph 1120 is for the same configuration as graph 1100, graph 1122 is for the same configuration as graph 1102, graph 1124 is for the same configuration as graph 1104 and graph 1126 is for the same configuration as graph 1106. Each of graphs 1120, 1122, 1124 and 1126 show the value of $P_{inter}$ (vertical axis 1128) for different numbers of component feed-forward PUFs, m (horizontal axis 1130). As can be seen, the FPGA experiments confirmed through hardware data that the interchip variation is close to 50% if more than 4 component feed-forward PUFs are XOR-ed together.

Security Analysis

A. Setup

For the security analysis, XOR PUFs and FFXOR PUFs with the number of component PUFs varying from m=2 to m=8 were simulated and their neural network models were trained. 32-stage MUX PUFs were used as the components for standard XOR PUFs. FF PUFs containing a single feed-forward intermediate arbiter (see FIG. 2), whose intermediate response was computed at the $15^{th}$ stage ($N_1$) and fed into the 25th stage ($N_2$), were used as components of FFXOR PUFs. XOR PUFs with m=8 were found to be attack resistant. For each of these configurations, data for 10 PUF instances were generated. For every PUF instance, several models were trained by increasing the size of the training set from 100k to 1M and the prediction accuracy on an independent test-set is reported. A set of 100,000 Challenge-Response Pairs (CRPs) each was used for testing and validation. The randomly chosen test challenges are kept consistent across all the models to have an unbiased comparison.

For configurations with standard arbiter PUFs as components, multilayer perceptrons with 2 hidden layers were implemented with 60 and 30 neurons, respectively. Since ANNs with 2 hidden layers were unable to accurately model FFXOR PUFs, 3 hidden layer structures with 120, 30 and 15 neurons, respectively, were trained. The training and testing errors were compared for each model to make sure that there is no overtraining. Cumulative XOR-ed challenges are used as inputs to ANN models. The neural networks were adapted to minimize mean square error using resilient backpropagation (RProp) as the training algorithm. RProp was chosen for its faster and more stable convergence as compared to standard backpropagation. All hidden neurons have hyperbolic tangent activation functions and the output neuron has a sigmoid activation. The final outputs were thresholded to be 1 if it is more than 0.5 and 0 otherwise.

B. Artificial Neural Network Results

Figure 12:
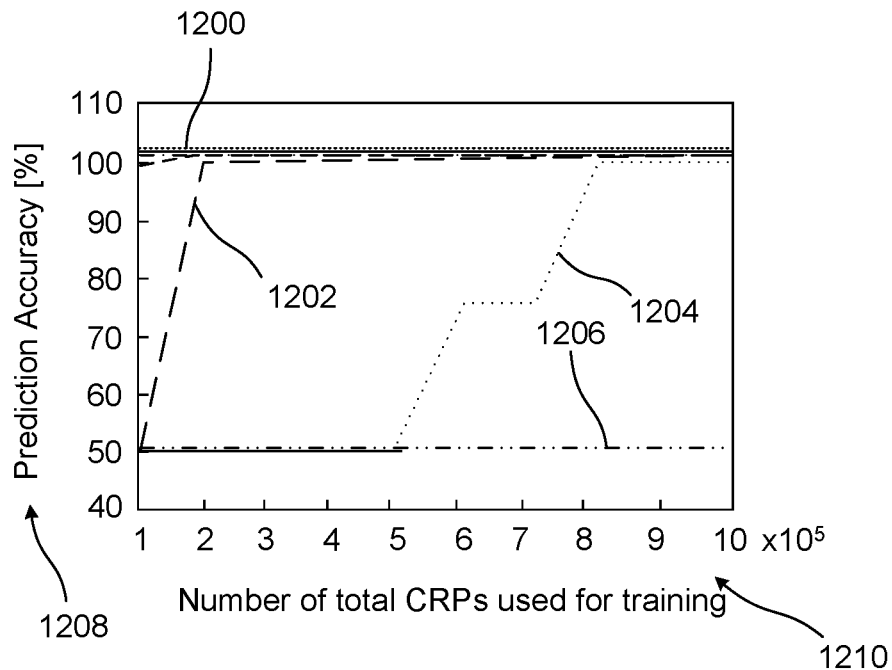
FIG. 12(*a*) shows graphs of prediction accuracy as a function of numbers of challenge-response pairs for different numbers of standard components.
Figure 12:
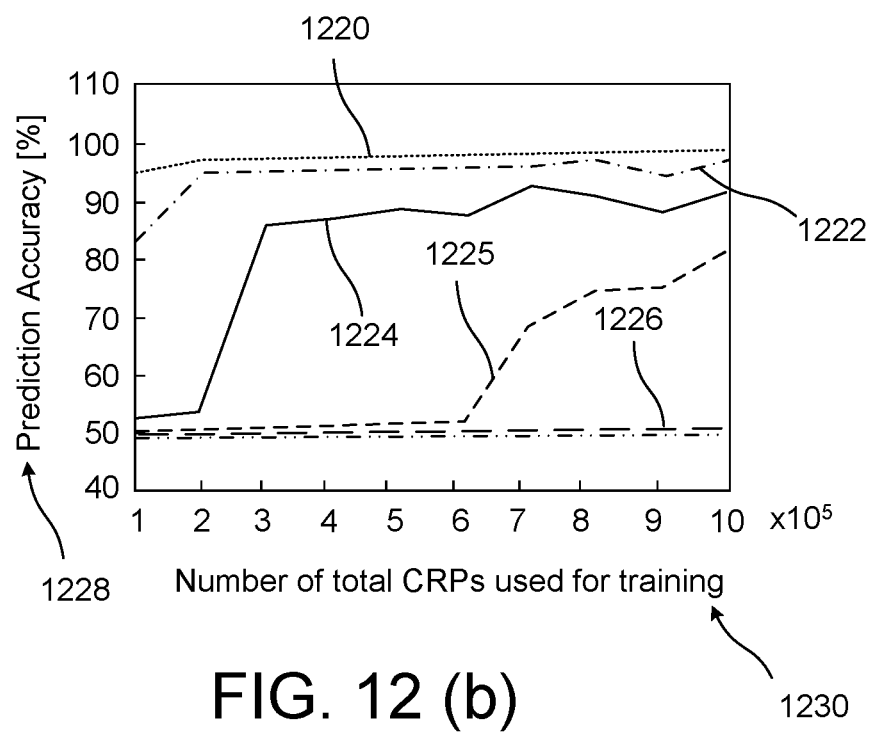

Prediction accuracies of standard arbiter XOR PUFs were evaluated by increasing the size of the training set from 100,000 CRPs to 1 million CRPs. FIG. 12(a) shows graphs 1200, 1202, 1204 and 1206 of the artificial neural network's prediction accuracy (vertical axis 1208) as a function of the number of Challenge-Response Pairs (horizontal axis 1210) used to train the artificial neural network. Graph 1200 represents the prediction accuracy for XOR PUFs with two, three, four or five standard PUFs applied to the XOR. Graph 1202 represents the prediction accuracy for an XOR PUF with six standard PUFs, graph 1204 shows the prediction accuracy for an XOR PUF with seven standard PUFs, and graph 1206 shows the prediction accuracy for an XOR PUF with eight standard PUFs. FIG. 12(b) shows graphs 1220, 1222, 1224, 1225 and 1226 of the artificial neural network's prediction accuracy (vertical axis 1228) as a function of the number of Challenge-Response Pairs (horizontal axis 1230) used to train the artificial neural network. Graph 1220 represents the prediction accuracy for feed-forward XOR PUFs with two feed-forward PUFs applied to the XOR, graph 1222 represents the prediction accuracy for three feed-forward PUFs, graph 1224 shows the prediction accuracy for four feed-forward PUFs, graph 1225 shows the prediction accuracy for five feed-forward PUFs and graph 1226 shows the prediction accuracy for a feed-forward XOR PUF with six, seven, or eight feed-forward PUFs. As expected, the prediction accuracy increases with increase in the training size, and smaller XOR PUFs were easier to model as compared to XOR PUFs with more components (say m=7 or 8). Each accuracy value is the median of 10 PUF instances. In case of the standard XOR PUFs, it can be observed that for m=2 to m=7, models can be trained with more than 95% accuracy. For m=8, the model is stuck at 50% accuracy. In case of FF PUFs, m=2, 3 and 4 achieve more than 90% accuracy while the models for PUFs with m>5 are not as accurate.

Figure 13:
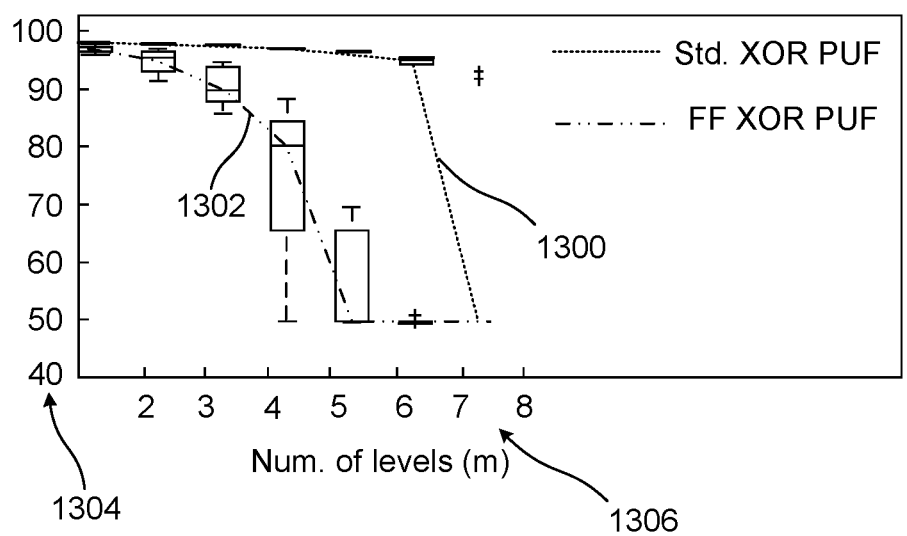
FIG. 13 shows graphs maximum prediction accuracy for different numbers of components.

The maximum accuracy values (vertical axis 1304) attained using 1 million CRPs as a function of number of component PUFs (horizontal axis 1306) in the circuit are presented in FIG. 13. Graph 1300 provides the maximum accuracies for standard XOR PUFs and graph 1302 provides the maximum accuracies for feed-forward PUFs. The model accuracies of standard and feed-forward XOR PUFs are presented in the form of a box-plot of 10 instances. As shown in FIG. 13, the use of feed-forward PUFs, makes it more difficult to construct a neural network that can be used to attack the security provided by the PUF.

C. Discussion

1) Logistic Regression Attacks: The resistance of XOR PUFs to machine learning attacks is leveraged by the fact that XOR is a non-linear operation and that the responses of component PUFs are hidden. But if the input bits are mapped to −1,1 instead of 0,1, an XOR is equivalent to a simple product of the inputs. Since each component of a standard XOR PUF can be described as a linear model, it is possible to use a linear approximation model for XOR PUFs despite the secrecy of the component PUFs' responses. If the attacker is aware that XOR PUFs are being used, the linear approximation facilitates logistic regression based attack strategies. However, the number of challenge-response pairs required for such attacks increases exponentially with respect to the number of PUFs used in the XOR. This led to the belief that XOR PUFs can withstand machine learning attacks if sufficient PUFs are applied to the XOR.

If FF PUFs are used as components, such a linear approximation is not valid. Even though alternatives such as evolutionary strategies or multi-layer perceptrons can be used to train neural networks to emulate FF PUFs, it has been shown that the training for emulating FF PUFs is much harder compared to training for emulating standard arbiter PUFs. For example, a 128-bit standard arbiter PUF requires 2.10 seconds of training while a FF PUF requires 3:15 hours of training using an evolutionary strategy.

2) Artificial Neural Network Attacks: The number of model parameters in an ANN is the product of the number of neurons in each layer. That is, if there are 3 layers with $n_1$; $n_2$; and $n_3$ neurons, respectively, the model is comprised of $n_1 \times n_2 \times n_3$ parameters. It can therefore be observed that FFXOR PUFs require significantly more resources to attack as compared to standard XOR PUFs: the number of ANN parameters required to train standard arbiter PUFs is 33×60×30×1=59,400 and for FF PUFs, it is 33×120×30×15×1=1,782,000. Note that the input layer has 33 parameters, including the bias, since the input size is 32 bits. This costs more computational resources and processing time for the attacker. This difference is expected to be more significant when dealing with XOR PUFs with more than 128 or 256-bit challenges.

The results in FIG. 9 show that the standard XOR PUFs studied in this paper can be trained with more than 95% prediction accuracy up to 7 levels while FFXOR PUFs with 5 levels only attain a maximum prediction accuracy of 80% and the models for more than 5 levels are just as good as random guessing (50% accuracy). These observations offer an important insight that more secure XOR PUFs that have much less area overhead can be designed by replacing standard arbiter PUFs with FF PUFs as elements. This is especially important as practical PUFs are expected to be lighter, i.e., having low hardware resources thus requiring less computations and lower power consumption.

Artificial neural networks are a straightforward black-box approach to model PUFs with minimal assumptions; it is assumed that the attacker has no knowledge about the underlying structure of the PUF. Although the ANN results of a standard XOR PUF are presented for the sake of comparison, the biggest threat to standard XOR PUFs are reliability based attacks.

D. Reliability Based Attacks

Several variants of arbiter PUFs and obfuscation strategies have been proposed in the literature to make them more secure against machine learning attacks. But recent advances show that they are insufficient in precluding machine learning attacks. In a recent study, reliability-based machine learning (RML) attacks have been shown to out-perform other machine learning attacks on XOR PUFs. This is because they employ a divide-and-conquer approach which utilizes reliability information that is inherently correlated to the responses. This new approach results only in a linear increase in the required number of challenge and responses with respect to m. This makes XOR PUFs vulnerable in practice regardless of their parameters. Two key ideas behind the attack are:

It utilizes an evolutionary strategy technique called CMA-ES to learn each component PUF individually which requires the knowledge of the design of the component PUFs.

The divide and conquer approach is based on the assumption that each component PUF contributes equally to the reliability of the XOR PUF.

1) Homogeneous FFXOR PUFs: For FFXOR PUFs, unlike standard XOR PUFs, the design of the component PUFs can be chosen by a designer. The secrecy of the design adds an additional layer of security. The attacker could potentially examine all possible FF loop positions and identify the design via trial and error. But this requires a significant increase in the attack time.

If we make an assumption that there is only one FF loop in a FFXOR PUF composed of N-stage FF PUFs as components, there are $$\frac{N(N-1)}{2}$$

possible FF loop placements. Therefore, the number of RML trials increases by 496 times for 32 bits and 2016 times for 64 bits. To study how this scales as more FF loops are used, let us make a lenient assumption that the attacker is aware of certain details about design such as the number of intermediate arbiters (denoted by $N_{arb}$) and the number of loops (the number of challenge bits replaced by intermediate responses—denoted by $N_{loops}$) for each intermediate arbiter. For simplicity, we consider two special cases of multi-loop FF PUFs: homogeneous-1 and homogeneous-2. These configurations are described as follows:

Homogeneous-1 (one intermediate arbiter): Multiple FF loops originating from the same intermediate arbiter ($N_{arb}$, =1).

Homogeneous-2 (multiple intermediate arbiters): All input stages and output stages of the FF loops are unique ($N_{arb}=N_{loops}$). In this design configuration, every FF loop originates from a different intermediate arbiter.

For FF PUFs with one intermediate arbiter and $N_{out}$ outputs (intermediate arbiter output is connected to $N_{out}$ stages), the number of RML trials would increase by a factor of $$\binom{N}{N_{out+1}}.$$

For the homogeneous-2 configuration, the number of RML trials would increase by a factor of $$\prod_{k=1}^{N_{loops}} \binom{N - 2(k-1)}{2}.$$

Table I presents these values for homogeneous-1 and homogeneous-2 configurations as $N_{loops}$ is varied from 1 to 8 for 64-bit and 128-bit PUFs. Thus, for an 8-loop FF PUF with one intermediate arbiter, the number of RML trials required is 275 billion for 64-bit PUFs and 19 trillion for 128-bit PUFs. On the other hand, with multiple intermediate arbiters, these values increase to 4e+25 and 7:6e+30, respectively. In general, if the attacker is not familiar with the design of all the component PUFs, the abundance of design parameter choices in a FFXOR PUF such as the number of intermediate arbiters and the number outputs for each intermediate arbiter makes it practically infeasible to predict the structure.

TABLE I

| $N_{loops}$ | Homogeneous-1 | | Homogeneous-2 | | Heterogenous | |
|---|---|---|---|---|---|---|
| | N = 64 | N = 128 | N = 64 | N = 128 | N = 64 | N = 128 |
| 1 | 2016 | 8128 | 2016 | 8128 | 2.7e+26 | 1.9e+31 |
| 2 | 4.2e+4 | 3.4e+5 | 3.8e+6 | 6.4e+7 | 4.5e+52 | 2.8e+62 |
| 3 | 6.3e+5 | 1.1e+7 | 6.7e+9 | 4.9e+11 | 4.3e+78 | 3.2e+93 |
| 4 | 7.6e+6 | 2.6e+8 | 1.1e+13 | 3.6e+15 | 2.4e+104 | 2.8e+124 |
| 5 | 7.5e+7 | 5.4e+9 | 1.7e+16 | 2.6e+19 | 7.6e+129 | 1.9e+155 |
| 6 | 6.2e+8 | 9.4e+10 | 2.5e+19 | 1.8e+23 | 1.3e+155 | 9.9e+185 |
| 7 | 4.4e+9 | 1.4e+12 | 3.3e+22 | 1.2e+27 | 1.3e+180 | 3.9e+216 |
| 8 | 2.7e+10 | 1.9e+13 | 4e+25 | 7.6e+30 | 6.5e+204 | 1.1e+247 |

2) Heterogeneous FFXOR PUFs: Heterogeneous FF XOR PUFs are theoretically secure against reliability based CMAES due to two reasons. The first reason has to do with the fact that the design of the component PUFs is unknown to an attacker. Even if the assumptions made for homogeneous FF PUFs are employed, the number of RML trials for heterogeneous FFXOR PUFs increases exponentially with the number of XOR levels. For an 8-level XOR PUF, these values are presented in Table I. The number of trials for heterogeneous PUFs is the number of trials required for homogeneous-2 raised to the eighth power since there are 8 component PUFs. The substantially high number of trials required makes an attack impracticable. More importantly, the divide and conquer approach used in reliability based attacks is not applicable as each component PUF contributes differently to the reliability of the XOR PUF. This is because the reliability of the FF PUFs varies based on the arrangement of the FF loops. This makes it impossible to extract reliability information of the component PUFs even if their designs are known. The feasibility of the attacks are summarized in Table II.

TABLE II

| | LR | ANNs | RML/ES |
|---|---|---|---|
| FF PUF | — | Feasible | Feasible if design known |
| Std. XOR PUF | Not feasible if large m | Not feasible if large m | Feasible |
| Homogeneous FFXOR PUF | Not feasible | Not feasible if large m | Feasible if design known |
| Heterogeneous FFXOR PUFF | Not feasible | Not feasible if large m | Not feasible |

VI. Reliability Analysis

Lack of stability in responses due to environmental variations is a major limitation of arbiter PUFs, especially for XOR PUFs. This can be due to change in operating conditions such as source voltage or temperature combined with aging effects. Random noise during measurement can also play a role. These effects are directly related to the delay differences in the circuit. To address, various embodiments use soft-response thresholding as a viable countermeasure in which the challenge is applied multiple times and statistics about the responses are collected. If the proper response is received more than a threshold percentage of the time, the PUF is considered to be authentic. The validity of this approach was confirmed by evaluating the performance of several FFXOR PUF configurations. They are further verified through hardware implementation on FPGA.

A. Setup

To emulate the effect of environmental and measurement noise, responses were generated by adding Gaussian noise with varying standard deviation to the delay difference at each stage. As a result, distribution of the delay differences is modified to $\Delta_i \sim \mathcal{N}(0,1) + \mathcal{N}(0, (\sigma_n^2))$. Here, $\sigma_n$ denotes the standard deviation of the noise. XOR PUFs with 2 levels to 8 levels were evaluated for the reliability analysis. Gaussian noise with zero mean and a standard deviation corresponding to 5%, 10% and 15% noise level was added to the delay difference parameters ($\Delta_i$) at each stage and to the arbiter delay ($\Delta_{arb}$). Noise level is defined as the ratio of the standard deviation of the noise to the standard deviation of delay differences at each stage. For a given design configuration, 100 PUF instances were generated. 100,000 randomly chosen unique challenges were extracted for each PUF and this was repeated for 100 samples of noise. For each PUF, a subset of 1000 responses were chosen to create a 100 noisy 1000-bit response signatures in order to calculate reliability. FFXOR PUFs with multiple loops and FFXOR PUFs with non-identical components (heterogeneous FFXOR PUFs) were also included in the analysis.

B. FFXOR PUFs with Single-Loop FF PUFs

Figure 14A:
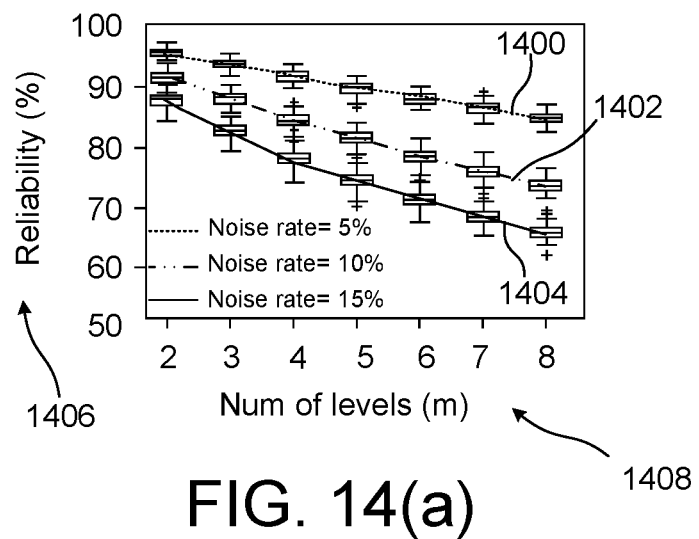
FIG. 14(*a*) shows graphs of reliability for different numbers of standard components.
Figure 14B:
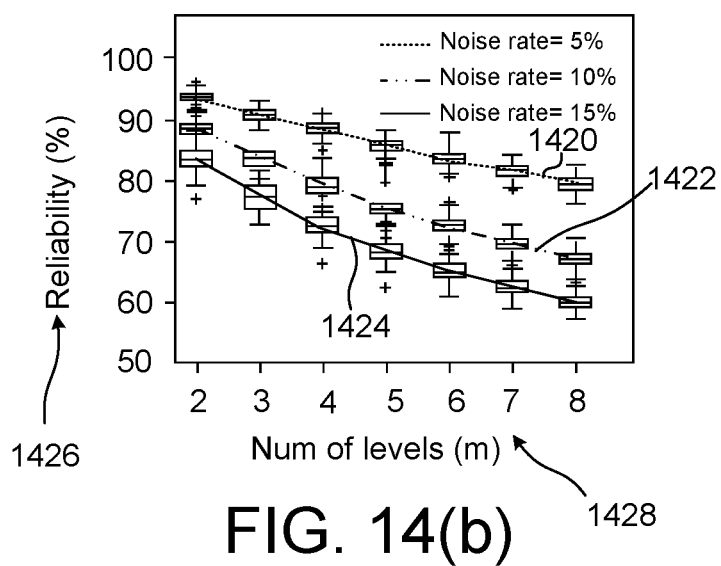

Reliability of feed-forward XOR PUFs up to 8 levels, m, (up to eight feed-forward PUFs being XOR-ed) were computed by adding noise to each of the 32 stages in the component PUFs. The component PUFs are FF PUFs with a FF loop placed between stages $N_1=10$ and $N_2=20$. For each case, i.e., for each value of m, 100 PUF instances with the same circuit design were simulated. For each instance, 100 noisy 1000-bit response signatures were generated. Intrachip variation was computed as $$P_{intra} = \frac{1}{n}\sum_{i=1}^{n}\frac{HD(R, R'_i)}{L} \qquad (10)$$

where n is the number of noisy response-vectors that represent different environmental conditions. The change in reliability with increase in the number of component PUF levels, m, is shown for standard XOR PUFs in FIG. 14(a) and for feed-forward XOR PUFs in FIG. 14(b). In FIG. 14(a), graphs 1400, 1402 and 1404 show the change in reliability (vertical axis 1406) as a function of number of standard PUF levels (horizontal axis 1408) for noise rates of 5%, 10%, and 15%, respectively. In FIG. 14(b), graphs 1420, 1422 and 1424 show the change in reliability (vertical axis 1426) as a function of number of feed-forward PUF levels (horizontal axis 1428) for noise rates of 5%, 10%, and 15%, respectively. It can be observed that reliability decreases as the number of levels increase and FFXOR PUFs have less reliability compared to standard XOR PUFs of the same size. Moreover, the reliability values of FFXOR PUFs drop at a slightly higher rate with respect to the value of m. These values can be used to extrapolate the trend to estimate how reliability scales with the increase in the number of component PUFs used. The results also show that reliability of XOR PUFs can be as low as 60% (for m=8). It has been shown that reliability of an N-stage FF PUF depends on the term, $$\arctan\left(\sqrt{\frac{N_2 - 1}{N - N_2 + 1}}\right).$$

We also evaluated 64-bit feed-forward PUFs (N=64) with the intermediate output measured at the 10th stage ($N_1=10$) and feeding into the 40th stage ($N_2=40$) and verified that they have similar reliability to 32-stage PUFs shown in FIG. 14. Note that the value of $$\arctan\left(\sqrt{\frac{N_2 - 1}{N - N_2 + 1}}\right)$$

is equal to 0.88 and 0.895 for the 32-bit and the 64-bit FF PUFs, respectively.

C. Soft-Response Thresholding

For a given challenge, soft-response of a PUF is defined as the probability that the response is 1 (Pr(R=1)) under environmental variations. Empirically, the soft-responses were computed by applying the same challenge 100 times under the presence of noise. As a convention, we use a threshold of 90% to measure the consistency of a response. That is, if the response for a challenge is 0 or 1 in 90% of the cases, it is considered a stable response. Otherwise, it is referred to as an unstable response. Therefore if Pr(R=1) is less than 10%, the response is considered a stable 0, and if it is greater than 90% it is considered a stable 1. If the value is between 10% and 90%, it is considered an unstable response. Thresholding delays or soft-responses can be an effective way to increase reliability.

Figure 15:
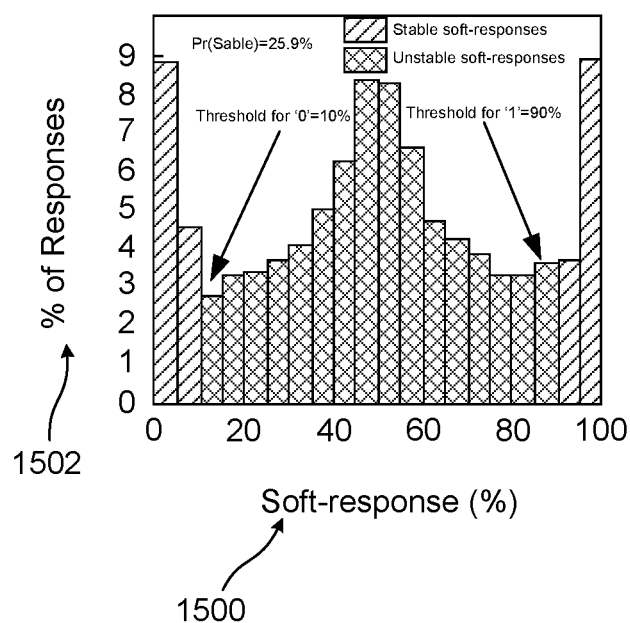
FIG. 15 shows a histogram of soft responses.
Figure 16:
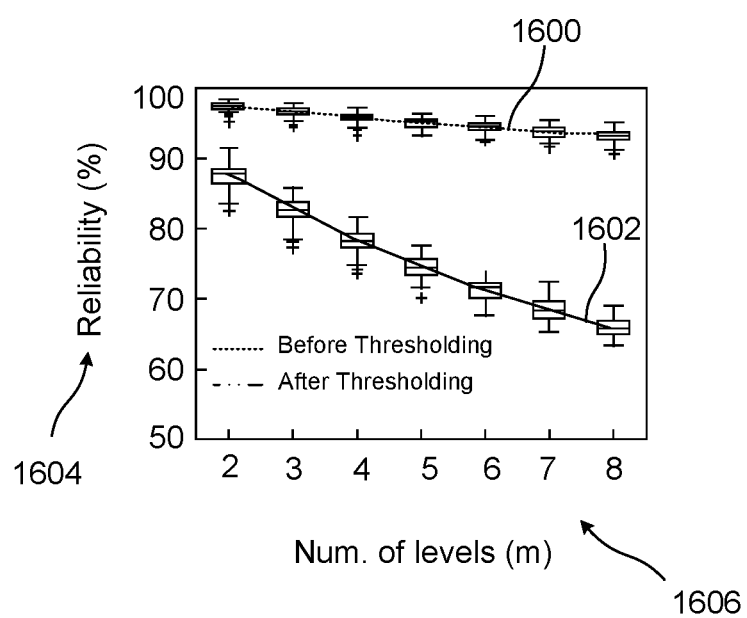
FIG. 16 shows graphs of reliability as a function of number of components with and without soft response thresholding.
Figure 17:
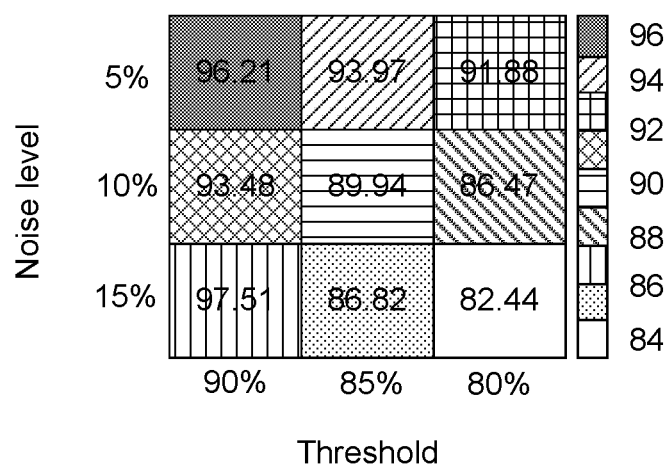
FIG. 17 is a chart of soft thresholding.

In case of XOR PUFs, a fundamental limitation is that a large portion of the challenges could lead to unstable responses, resulting in low reliability as illustrated in FIGS. 14(a) and 14(b). For a FFXOR PUF with eight levels, the soft-response values associated with 20,000 challenges are shown in FIG. 15, which shows a histogram of the soft-response percentages for the 20,000 challenges with the soft-response percentage shown along horizontal axis 1500 and the percent of all responses shown along vertical axis 1502. It can be observed that 25.9% of the responses are stable. In general, for an XOR PUF with m-levels, the proportion of stable responses is $\Pi_{i=1}^{m} s_i$, where $s_i$ is the stability of the i-th component PUF. Since all the components are expected to have similar stability (s) for homogeneous XOR PUFs, the over-all stability can be expressed as $s^m$. We know that soft-responses can be computed by repetitive measurement of responses. Soft responses of the eight-level FFXOR PUF were computed by assigning each challenge 100 times. A subset of challenges were then chosen by thresholding the soft-responses using 90-10 thresholding. The challenges that generate stable responses are referred to as stable challenges. Instead of using a set of 1000 randomly chosen challenges, 1000 stable challenges were used to compute the reliability. Graphs 1600 and 1602 show how reliability (vertical axis 1604) changes with the number of levels, m (horizontal axis 1606), while using soft thresholding and while not using soft thresholding, respectively. FIG. 16 shows that reliability of XOR PUFs during authentication can be significantly increased by thresholding the soft-responses and identifying stable challenges. For example, the reliability of an 8-level FFXOR PUF can be increased from 66% to 93.5%. The resultant reliability achieved by thresholding depends on the value of the threshold used. If the threshold is reduced the number of stable challenges will increase but this may cause a degradation in reliability. The effect of varying the threshold value on the reliability of eight-level FFXOR PUFs is shown in FIG. 17 for different noise levels.

D. FFXOR PUFs with Multi-Loop FF PUFs

Modified feed-forward (MFF) PUFs have intermediate arbiter outputs feeding into two consecutive stages instead of one. In accordance with one embodiment, FFXOR PUFs with MFF PUFs as the components are used to improve reliability. Results of a reliability analysis of sixteen homogeneous eight-level FFXOR PUFs with up to eight loops are presented in Table III of FIG. 18. The proportion of stable challenges and the reliability values computed before and after thresholding are shown for different noise levels. These values were computed using 90% threshold and each value is the median of 100 PUF instances. The results show that MFF PUFs (in rows B*, C*, D*, E*, I* and J*) can be used to attain reliability close to standard XOR PUFs. In case of PUFs with one intermediate arbiter, having 1, 3 or 5 loops results in less reliability compared to having even number of loops. Using multiple intermediate arbiters can result in very low values of reliability (53%) and the proportion of stable challenges (1-3%) under 15% noise. Two such examples—designs I and J—can be noticed in the table of FIG. 18. However, replacing FF loops with MFF loops (denoted by *) leads to improved reliability. The results also confirm that the soft-response thresholding strategy can be employed to significantly increase the reliability of response signatures to at least 89%. It is also important to note that XOR PUFs have a huge set of challenges to choose from, i.e., $2^N$ challenges for N-bit PUFs. For 64-bit XOR PUFs, if we assume that a mere 1% of the challenges are stable, the server still has $1.8 \times 10^8$ billion (1% of $2^{64}$) stable challenges to choose from. As mentioned in the previous section, heterogeneous PUFs can have better security features. So, the reliability analysis is extended to heterogeneous PUFs and the results for six configurations are shown in Table IV below. Note that heterogeneous FFXOR PUFs with better reliability can be constructed by using FF PUFs with higher reliability as components.

E. FPGA Results

The reliability performance of FFXOR PUFs was tested using an FPGA. 64-bit FFXOR PUFs were implemented on a Xilinx Basys-3 Artix-7 FPGA board. A total of 10,000 randomly chosen 64-bit challenges were evaluated for each PUF. Each challenge was assigned 100 times to compute the soft responses. Similar to the simulation results, 1000 responses were used to compute the stability and pre-thresholding reliability values, and 1000 stable responses were used to compute the post-thresholding reliability. All the results are presented in Table V.

TABLE V

| Design Num. | Num. LUTs | % Stable | Rel. (%) Before | Rel. (%) After |
|---|---|---|---|---|
| A | 1323 | 96.8 | 98.5 | 99.51 |
| B | 1354 | 95.3 | 98.13 | 99.35 |
| B* | 1370 | 97.4 | 98.73 | 99.46 |
| C | 1371 | 95.5 | 98.08 | 99.39 |
| D | 1383 | 96.3 | 98.38 | 99.38 |
| C* | 1403 | 97.3 | 98.39 | 98.99 |
| E | 1402 | 96 | 98.26 | 99.43 |
| F | 1419 | 96.3 | 98.42 | 99.4 |
| D* | 1384 | 97.3 | 98.79 | 99.56 |
| G | 1432 | 93.2 | 97.54 | 99.39 |
| E* | 1424 | 95.8 | 98.33 | 99.49 |
| H | 1425 | 95.6 | 98.21 | 98.38 |
| I | 1406 | 94.3 | 97.64 | 99.34 |
| I* | 1438 | 97 | 98.47 | 99.37 |
| J | 1405 | 90.3 | 96.55 | 99.14 |
| J* | 1403 | 95.5 | 98.48 | 99.39 |
| K | 1352 | 95.3 | 98.19 | 99.38 |
| L | 1426 | 96.3 | 98.54 | 98.42 |
| M | 1422 | 93.5 | 97.43 | 99.35 |
| N | 1483 | 93.1 | 97.65 | 99.38 |
| O | 1449 | 90 | 96.65 | 99.23 |
| P | 1514 | 94.7 | 97.88 | 99.45 |

The designs A through P correspond to the respective designs in Table III of FIG. 18 and Table IV. The reliability values computed from hardware data validate the observations made from simulation results. It can be noted that the specific values of stability/reliability from FPGA data are higher than the simulation based data. This is because the variation in responses, i.e., effect of noise on the responses from hardware, appears to be less than what was assumed for the simulations. The general trend and the observations are still in accordance with the simulation.

Although the additional security benefits of FFXOR PUFs come at the price of degraded reliability, the results illustrate that there are simple yet effective countermeasures such as modifying the design with MFF loops or by thresholding soft responses. These solutions do not incur significant complexity or hardware overheads. The hardware utilization for each of the designs is also reported in Table V. It is also worth noting that the uniqueness analysis and the discussions presented earlier on security of multi-loop FFXOR

TABLE IV

| Design Num. | Components | Noise Level = 5% | | | Noise Level = 10% | | | Noise Level = 15% | | |
|---|---|---|---|---|---|---|---|---|---|---|
| | | % Stable | Rel. (%) Before | Rel. (%) After | % Stable | Rel (%) Before | Rel. (%) After | % Stable | Rel (%) Before | Rel. (%) After |
| K | 4 × D, 4 × E | 77.60 | 89.95 | 98.33 | 59.92 | 82.10 | 97.00 | 46.22 | 76.26 | 95.84 |
| L | 2 × D, 2 × E, 2 × D*, 2 × E* | 77.47 | 89.94 | 98.41 | 60.81 | 82.59 | 97.26 | 48.65 | 76.96 | 96.35 |
| M | 2 × D, 2 × E, 2 × I, 2 × J | 50.43 | 78.04 | 96.50 | 26.12 | 66.78 | 94.23 | 14.02 | 60.52 | 92.98 |
| N | 2 × I, 2 × I*, 2 × J, 2 × J* | 46.21 | 76.20 | 96.19 | 21.83 | 64.66 | 93.91 | 10.49 | 59.01 | 92.40 |
| O | 4 × I, 4 × J | 30.88 | 69.12 | 94.39 | 9.62 | 58.38 | 91.73 | 3.04 | 53.89 | 90.08 |
| P | 4 × I*, 4 × J* | 58.36 | 81.39 | 96.79 | 34.05 | 70.73 | 94.71 | 19.54 | 63.74 | 92.88 |

PUFs are also valid for PUFs containing MFF loops. The following specific conclusions can be made from the overall reliability analysis.

Using component PUFs with higher reliability increases the reliability of resultant XOR PUFs.

MFF PUFs or PUFs with MFF loops can be used as components to increase the reliability.

In case of PUFs with one intermediate arbiter, having 1, 3 or 5 loops results in less reliability compared to having even number of loops.

Soft-response thresholding can be used to choose stable challenges that lead to a substantial increase in reliability.

VII. Randomness Analysis

Figure 19:
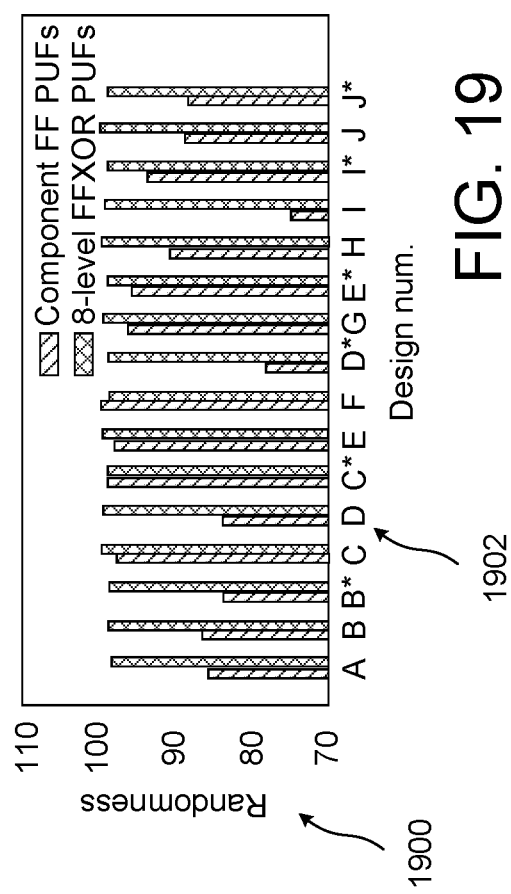
FIG. 19 provides graphs of randomness for various feed-forward configurations.

The fundamental principle behind delay-based PUFs such as arbiter PUFs is to compare the mismatch in delays of structurally identical circuit elements caused by manufacturing processes and not by the design. Hence, the effectiveness of an arbiter PUF depends on how much symmetry can be achieved between the delay chains. It is inherently difficult to implement arbiter PUFs on FPGA due to the delay skew present between a pair of circuit elements that are required to be symmetric. This is because a significant bias might be introduced between upper and lower paths due to unavoidable routing skew. This bias may be difficult to eliminate in case of FF PUFs due to the intermediate arbiters. However, the need to eliminate the asymmetry or any inherent design bias is alleviated when multiple FF PUFs are XOR-ed. To demonstrate this, we implement several 64-bit FFXOR PUFs in FPGA. 10,000 challenge-response pairs were extracted and the P(R=1) (randomness) in the 10,000-bit response signatures was computed. We compare the randomness of the FPGA FFXOR PUFs with that of the FPGA component FF PUFs in FIG. 19 where randomness is shown on vertical axis 1900 and the design values on horizontal axis 1902 correspond to the design numbers of Table III of FIG. 18. The results show that in spite of the existing bias in component PUFs, P(R=1) in the 64-bit FFXOR PUFs is 50%. Thus, the proposed FFXOR PUFs are ideal for FPGA implementations. These FPGA FFXOR PUFs can be realized using standard tools and do not require any special effort to balance the path delays in the competing paths. It may be noted that the randomness of an XOR PUF is also described by Eq (7) in terms of randomness of a component PUF. The randomness of the XOR PUF approaches 50% with increase in the number of components. The XOR PUF is random even if the component PUF is not random if the number of components is large.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. An apparatus comprising:
a first feed-forward PUF;
a second feed-forward PUF; and
an exclusive-or circuit configured to perform an exclusive-or operation involving an output of the first feed-forward PUF together with an output of the second feed-forward PUF.

2. The apparatus of claim 1 wherein the first feed-forward PUF has a same structure as the second feed-forward PUF.

3. The apparatus of claim 1 wherein the first feed-forward PUF has a different structure from the second feed-forward PUF.

4. The apparatus of claim 3 wherein the first feed-forward PUF has a different number of intermediate arbiters than the second feed-forward PUF.

5. The apparatus of claim 3 wherein the first feed-forward PUF has a different configuration of feed-forward loops than the second feed-forward PUF.

6. The apparatus of claim 1 further comprising additional feed-forward PUFs, each having an output that is included in the exclusive-or operation.

7. The apparatus of claim 1 wherein the first feed-forward PUF has a modified feed-forward loop.

8. The apparatus of claim 1 wherein an output of the exclusive-or operation is a response to a challenge applied to the first feed-forward PUF and the second feed-forward PUF.

9. A method comprising:
executing a first feed-forward PUF to produce a first response;
executing a second feed-forward PUF to produce a second response;
applying the first response and the second response at a same time to an exclusive-or circuit to produce an XOR response.

10. The method of claim 9 wherein executing the first feed-forward PUF and executing the second feed-forward PUF comprises applying a same challenge to the first feed-forward PUF and the second feed-forward PUF.

11. The method of claim 9 wherein the first feed-forward PUF has a same structure as the second feed-forward PUF.

12. The method of claim 9 wherein the first feed-forward PUF has a different structure from the second feed-forward PUF.

13. The method of claim 12 wherein the first feed-forward PUF has a different number of intermediate arbiters than the second feed-forward PUF.

14. The method of claim 12 wherein the first feed-forward PUF has a different feed-forward loop configuration than the second feed-forward PUF.

15. The method of claim 9 wherein the first feed-forward PUF has a modified feed-forward loop.

16. The method of claim 9 wherein the XOR response is expected to be equal to a stored response less than one hundred percent of the time but more than a threshold percentage of time.

17. An integrated circuit comprising:
a plurality of feed-forward PUFs, each providing a separate response so as to provide a plurality of separate responses;
an exclusive-or circuit applying an exclusive-or operation to the plurality of separate responses to produce a single exclusive-or response for the plurality of separate responses, wherein the single exclusive-or response is equal to the exclusive-or of the plurality of separate responses.

18. The integrated circuit of claim 17 wherein each of the plurality of feed-forward PUFs has a same structure.

19. The integrated circuit of claim 17 wherein at least one of the plurality of feed-forward PUFs has a different structure from another of the plurality of feed-forward PUFs.

20. The integrated circuit of claim 17 wherein at least one of the plurality of feed-forward PUFs is a modified feed-forward PUF.

* * * * *